(12) United States Patent
Kim et al.

(10) Patent No.: US 7,210,787 B2
(45) Date of Patent: May 1, 2007

(54) HIGH EFFICIENCY PROJECTION SYSTEM AND METHOD OF FORMING COLOR IMAGE USING THE SAME

(75) Inventors: Dae-sik Kim, Suwon-si (KR); Kun-ho Cho, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/862,906

(22) Filed: Jun. 8, 2004

(65) Prior Publication Data

US 2005/0012904 A1    Jan. 20, 2005

(30) Foreign Application Priority Data

Jun. 13, 2003    (KR)    ............ 10-2003-0038319

(51) Int. Cl.
*G03B 21/14*    (2006.01)
(52) U.S. Cl. ................ 353/33; 353/20; 353/84; 348/752
(58) Field of Classification Search ............ 353/30–33, 353/20, 84, 97, 101, 102, 122; 348/742, 348/743, 740, 756, 757, 758, 752; 349/8, 349/9, 57, 58
See application file for complete search history.

(56) References Cited

U.S. PATENT DOCUMENTS

| | | | |
|---|---|---|---|
| 5,517,340 A * | 5/1996 | Doany et al. ............ 349/5 |
| 6,203,160 B1 | 3/2001 | Ho | |
| 6,568,815 B2 * | 5/2003 | Yano .................. 353/84 |
| 6,814,450 B2 * | 11/2004 | Kim .................... 353/94 |
| 6,877,865 B2 * | 4/2005 | English et al. ........ 353/97 |
| 7,008,064 B2 * | 3/2006 | McDonald .......... 353/84 |
| 2001/0038483 A1 * | 11/2001 | Lambert ............ 359/196 |
| 2002/0067545 A1 | 6/2002 | Chuang | |
| 2002/0191154 A1 | 12/2002 | Shahzad et al. | |

FOREIGN PATENT DOCUMENTS

| | | |
|---|---|---|
| EP | 1 253 787 A2 | 10/2002 |
| JP | 2002-341346 A | 11/2002 |
| WO | WO 02/098143 A1 | 12/2002 |

OTHER PUBLICATIONS

Chinese Office Action, dated Jan. 27, 2006.

* cited by examiner

*Primary Examiner*—W. B. Perkey
*Assistant Examiner*—Andrew Sever
(74) *Attorney, Agent, or Firm*—Sughrue Mion, PLLC

(57) ABSTRACT

A projection system and a method of forming a color image are provided. A projection system includes a light source, a color splitter which splits light emitted from the light source into colors according to a plurality of wavelength ranges, a scrolling unit which scrolls the colors split by the color splitter, a polarization converter which converts the light emitted from the light source into light having a first polarization, a color selector which converts at least some of the light having the first polarization into light having a second polarization different from the first polarization, an image combiner which transmits or reflects light transmitted by the color selector according to a polarization direction, and at least two light valves each of which receives light transmitted by the image combiner and processes the received light according to an image signal to form an image.

89 Claims, 28 Drawing Sheets

HIGH EFFICIENCY PROJECTION SYSTEM AND METHOD OF FORMING COLOR IMAGE USING THE SAME

BACKGROUND OF THE INVENTION

This application claims the priority of Korean Patent Application No. 2003-38319, filed on Jun. 13, 2003, in the Korean Intellectual Property Office, the disclosure of which is incorporated herein in its entirety by reference.

1. Field of the Invention

The present invention relates to a high efficiency projection system and a method of forming a color image using the same. More particularly, the present invention relates to a projection system which uses a plurality of light valves, thereby accomplishing a wide color gamut and color temperature and improving light efficiency, and a method of forming a color image using the same.

2. Description of Related Art

Projection systems are divided into a three-panel type and a single-panel type according to the number of light valves which control light emitted from a high-output lamp light source to be turned on or off in each pixel. A single-panel projection system has a smaller optical structure than a three-panel projection system but has only ⅓ of the light efficiency of the three-panel projection system because it splits white light into red (R), green (G), and blue (B) light using a sequential method. Accordingly, research and development have been performed to increase light efficiency of single-panel projection systems.

A general single-panel panel projection optical system splits light emitted from a white light source into R, G, and B light using a color filter, sequentially transmits the R, G, and B light to a light valve, and operates the light valve according to the order of color to form an image. Since such a single-panel optical system uses colors sequentially, the light efficiency of the single-panel optical system is only ⅓ of that of a three-panel optical system. Approaches for increasing light efficiency of a single-panel projection system have been developed, and a scrolling method has been proposed as one of these approaches. According to the color scrolling method, white light is split into R, G, and B light, and the R, G, and B light is simultaneously transmitted to different positions on a light valve. In addition, because an image can be formed only when all of the R, G, and B light reaches each pixel, color bars are periodically moved in a cycle using a particular method.

A conventional single-panel scrolling projection system is disclosed in U.S. patent Publication No. 2002/191154 A1. As shown in FIG. 1, in the conventional single-panel scrolling projection system, white light emitted from a light source 100 passes through first and second lens arrays 102 and 104 and a polarization converter 105 and is split into R, G, and B light by first through fourth dichroic filters 109, 112, 122, and 139. For example, the R and B light is transmitted by the first dichroic filter 109 and proceed on a first optical path L1, and the G light is reflected by the first dichroic filter 109 and proceeds on a second optical path L2. The R and B light proceeding on the first optical path L1 is split again by the second dichroic filter 112 such that the R light is transmitted by the second dichroic filter 112 and goes straight on the first optical path L1 and the G light is reflected by the second dichroic filter 112 and proceeds on a third optical path L3.

First through third prisms 114, 135, and 142 are rotatably disposed on the first through third optical paths L1, L2, and L3, respectively. Light radiated from the light source 100 is split into R, G, and B light, and the R, G, and B light is scrolled by the corresponding first through third prisms 114, 135, and 142, respectively. The first through third prisms 114, 135, and 142 rotate at a constant speed so as to scroll R, G, and B color bars. The G and B light respectively proceeding on the second and third optical paths L2 and L3 is respectively transmitted and reflected by the third dichroic filter 139 and thus mixed. Thereafter, the R, G, and B light is mixed by the fourth dichroic filter 122 and then transmitted by a polarizing beam splitter 127 to a light valve 130. The light valve forms a color image.

A focusing lens 107 is disposed next to the polarization converter 105, and lenses 110, 117, 131, 137, 145 for optical path compensation are disposed on the first through third optical paths L1, L2, and L3. A focusing lens 120 is disposed between the first dichroic filter 112 and the fourth dichroic filter 122, and a focusing lens 140 is disposed between the third dichroic filter 139 and the fourth dichroic filter 122. A focusing lens 124 and a polarizer 125 are disposed on an optical path between the fourth dichroic filter 122 and the polarizing beam splitter 127. Optical path converters, for example, reflecting mirrors 118 and 133 are disposed on the first and third optical paths L1 and L3, respectively, to change an optical path of light.

FIG. 2 illustrates a procedure in which the R, G, and B color bars are scrolled by the rotations of the first through third prisms 114, 135, and 142. FIG. 2 shows how the color bars formed on a surface of the light valve 130 are periodically cycled when the first through third prisms 114, 135, and 142 corresponding to respective colors are rotated in synchronization with one another. When the R, G, and B color bars are moved in a single cycle, a color image of a single frame is formed.

The light valve 130 processes an image signal for each pixel to form an image, and the image is enlarged and projected onto a screen by a projection lens unit (not shown).

In conventional single-panel systems forming a color image using the scrolling method, it is difficult to implement multi channels by forming three or more color bars. When light radiated from a light source is split into three or more colors in conventional single-projection systems, the etendue of an optical system increases, which makes the formation of an optical system difficult.

The term "etendue" (E) refers to a conserved physical quantity measuring the dimensions of light in an optical system. The etendue is obtained using an area of a target, the etendue of which is to be measured, and the square of a sine value of half of an angle at which light is incident onto or output from the area of the target and can be expressed as the following equation.

$$E = \pi A \sin^2(\theta_{1/2}) = \frac{\pi A}{(2F/No)^2}$$

Here, F/No indicates an F number of a lens, and a relationship $$\sin(\theta_{1/2}) = \frac{1}{(2F/No)}$$

is accomplished. With an increase in an etendue, an optical system increases in volume and becomes complicated in structure.

Since it is difficult to form three or more color bars in conventional single-panel projection systems using color scrolling, increasing a color gamut is limited, and implementation of various colors is difficult.

SUMMARY OF THE INVENTION

The present invention provides a projection system in which light radiated from a light source is split into a plurality of colors, and the plurality of colors are separately transferred to a plurality of light valves, so that a color image is formed by scrolling, so as to increase a color gamut and the range of color temperature and efficiently adjust an etendue.

The present invention also provides a method of a system of forming a color image through scrolling using a plurality of light valves.

According to an aspect of the present invention, there is provided a projection system including a light source; a color splitter which splits light emitted from the light source into colors according to a plurality of wavelength ranges; a scrolling unit which scrolls the colors split by the color splitter; a polarization converter which converts the light emitted from the light source to have a first polarization; a color selector which converts at least some of the light having the first polarization to have a second polarization different from the first polarization; an image combiner which transmits or reflects light transmitted by the color selector according to a polarization direction; and at least two light valves each of which receives light transmitted by the image combiner and processes the received light according to an image signal to form an image.

The scrolling unit may include at least one cylindrical lens cell arranged in a spiral pattern and is installed rotatably.

The scrolling unit may includes a first spiral lens disk and a second spiral lens disk each of which includes at least one cylindrical lens cell arranged in a spiral pattern and may further include a light guide plate or a glass rod between the first and second spiral lens disks.

The scrolling unit may include at least one cylindrical lens cell formed in a spiral pattern on a pillar surface.

The color splitter may include at least two dichroic filters which slant at different angles with respect to an optical axis.

The color splitter may include at least two prisms each of which includes a dichroic filter.

The projection system may further include at least one filter having a slit for adjusting a divergence angle of incident light on an optical path between the light source and the color splitter.

The image combiner may be a polarizing beam splitter or a wire-grid polarizing beam splitter.

The projection system may further include a first fly-eye lens array and a second fly-eye lens array on an optical path between the color splitter and the image combiner.

According to another aspect of the present invention, there is provided a projection system including a light source; a color splitter which splits light emitted from the light source into colors in a plurality of wavelength ranges, the color splitter including first and second dichroic filters slating at different angles with respect to an optical axis; a scrolling unit which scrolls the colors split by the color splitter; a polarization converter which converts the light emitted from the light source to have a first polarization; a color selector which converts at least some of the light having the first polarization to have a second polarization different from the first polarization; an image combiner which transmits or reflects light transmitted by the color selector according to a polarization direction; and first and second light valves each of which receives light transmitted by the image combiner and processes the received light according to an image signal to form an image.

The first and second dichroic filters may split the light emitted from the light source into light in a first wavelength range and light in a second wavelength range, and the color selector may convert a polarization direction of at least some of the light in at least one of the first and second wavelength ranges.

The first dichroic filter may reflect the light in the first wavelength range including a first color light and a second color light of the light emitted from the light source. The second dichroic filter may reflect the light in the second wavelength range including a third color light and a fourth color light. The color selector may convert the polarization direction of the first and third colors.

The color splitter may further include a third dichroic filter which slants at a different angle than the first and second dichroic filters.

The first through third dichroic filters may split the light emitted from the light source into light in first through third wavelength ranges, respectively, and the color selector may convert a polarization direction of at least some light in at least one among the first through third wavelength ranges.

The first dichroic filter may reflect light in the first wavelength range including a first color light and a second color light in the light emitted from the light source. The second dichroic filter may reflect light in the second wavelength range including a third color light and a fourth color light. The third dichroic filter may reflect light in the third wavelength range including a fifth color light and a sixth color light. The color selector may convert the polarization direction of the first, third, and fifth colors.

The projection system may further include a first cylinder lens which is disposed on an optical path between the light source and the scrolling unit to reduce a width of light incident onto the scrolling unit; and a second cylinder lens which is disposed on an optical path between the color splitter and the image combiner to collimate light transmitted by the scrolling unit.

According to still another aspect of the present invention, there is provided a projection system including a light source; a scrolling unit which includes one or more lens cells and is installed rotatably, the scrolling unit scrolling the incident light; a color splitter which splits the light transmitted by the scrolling unit according to at least two wavelength ranges; a polarization converter which converts the light emitted from the light source to have a first polarization; a color selector which converts at least some of the light having the first polarization to have a second polarization different from the first polarization; an image combiner which transmits or reflects light transmitted by the color selector according to a polarization direction; and at least two light valves each of which receives light transmitted by the image combiner and processes the received light according to an image signal to form an image.

According to yet another aspect of the present invention, there is provided a projection system including a light source; a scrolling unit which includes one or more lens cells and is installed rotatably, the scrolling unit scrolling the incident light; a color splitter which includes first and second dichroic filters arranged in parallel with each other, the color splitter splitting the light transmitted by the scrolling unit according to wavelength; a polarization converter which converts the light emitted from the light source to have a first polarization; a color selector which converts at least some of the light having the first polarization to have a second polarization different from the first polarization; an image combiner which transmits or reflects light transmitted by the color selector according to a polarization direction; and first and second light valves each of which receives light transmitted by the image combiner and processes the received light according to an image signal to form an image.

The scrolling unit may include at least one cylindrical lens cell arranged in a spiral pattern, and a rotary motion of the scrolling unit is converted into a rectilinear motion of a lens array in an area of the scrolling unit through which light passes.

According to a further aspect of the present invention, there is provided a method of forming a color image, including splitting incident light into a plurality of wavelength ranges; converting the incident light to have a first polarization; converting at least some of the light having the first polarization to have a second polarization different from the first polarization; separately modulating color light having the first polarization and color light having the second polarization using a plurality of light valves; and scrolling the color light having the first polarization and the color light having the second polarization to form a color image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
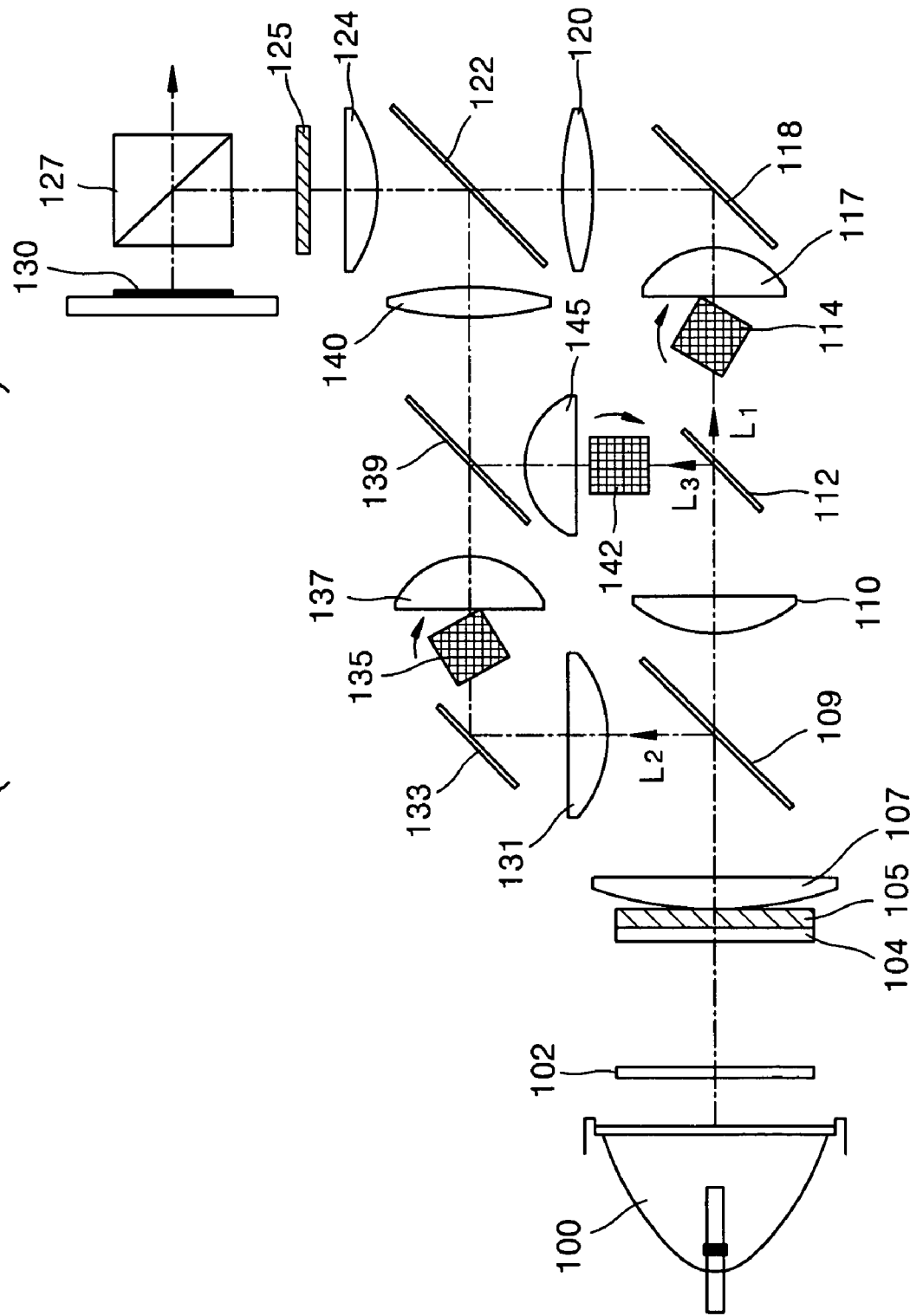
FIG. 1 is a diagram of a conventional projection system.
Figure 2:
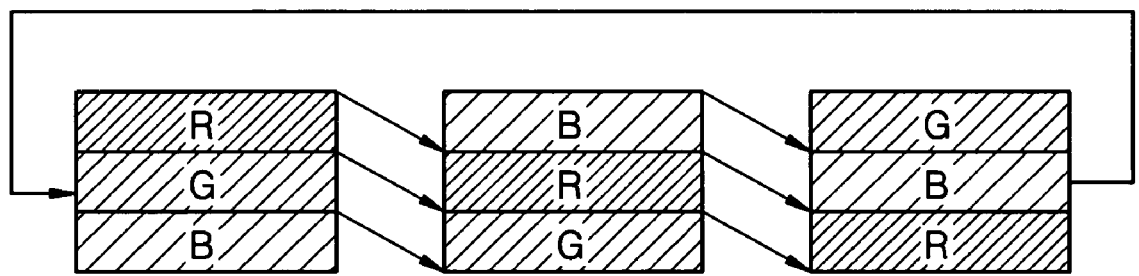
FIG. 2 is a diagram illustrating a color scrolling operation of a conventional projection system.
Figure 3:
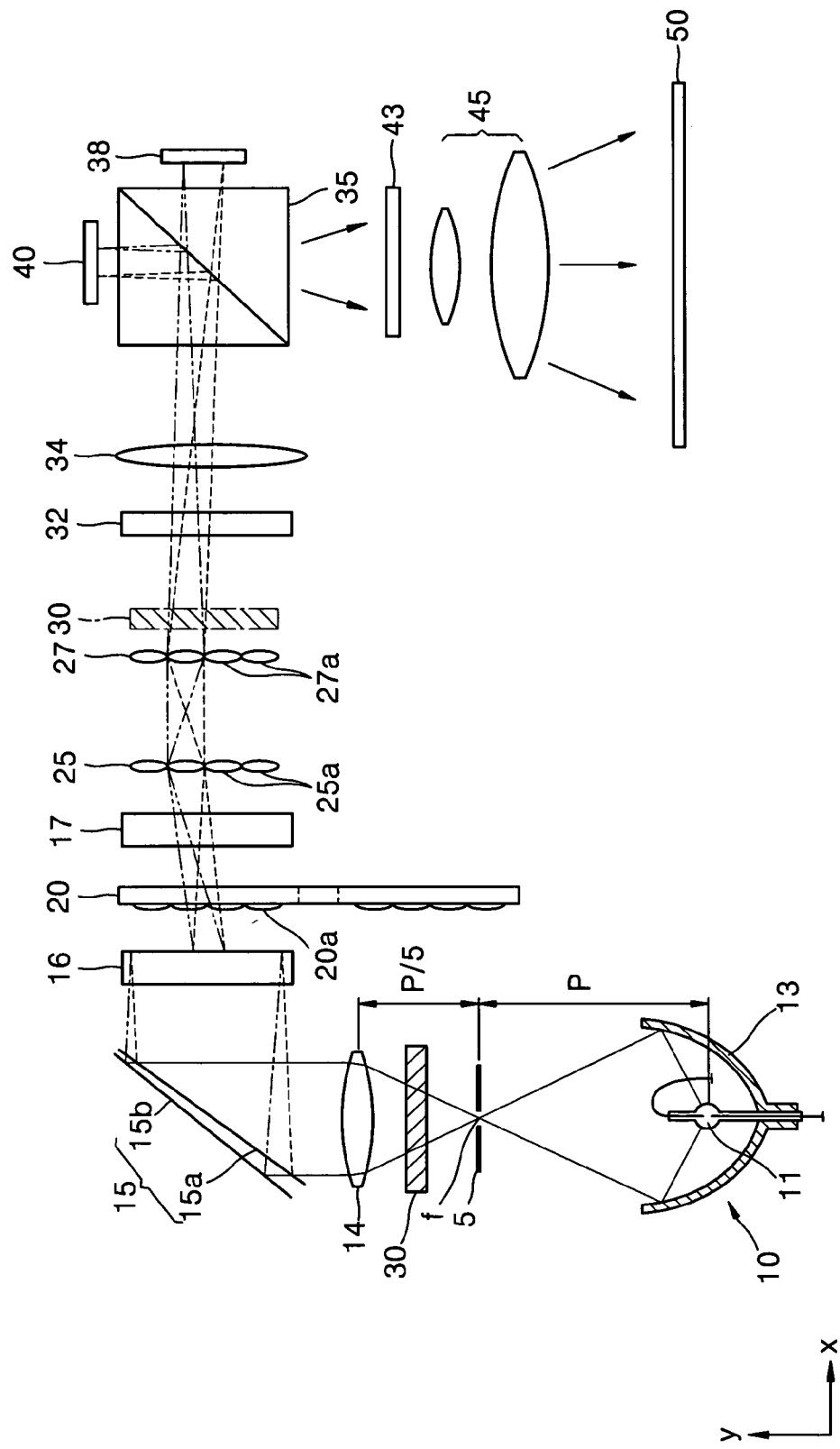
FIG. 3 is a diagram of a projection system according to a first embodiment of the present invention.

Referring to FIG. 3, a projection system according to a first embodiment of the present invention includes a light source 10, a color splitter 15 which splits light radiated from the light source 10 into a plurality of colors according to wavelength, a scrolling unit 20 which scrolls the plurality of colors, a color selector 32 which converts the polarization direction of light, transmitted by the color splitter 15, having a predetermined wavelength, at least two light valves which process the color light scrolled by the scrolling unit 20 according to image signals to form a color image, and a projection lens unit 45 which enlarges and projects the color image formed by the two light valves onto a screen 50.

In addition, a polarization converter 30 which converts incident light into light having a predetermined polarization direction is provided. The polarization converter 30 may be disposed at any position between the light source 10 and the color selector 32. Preferably, but not necessarily, the polarization converter 30 is disposed between the light source and the color splitter 15.

The light source 10 radiates white light and includes a lamp 11 which generates light and a reflecting mirror 13 which reflects the light emitted from the lamp 11 to guide the light to a predetermined path. The reflecting mirror 13 may be implemented by an elliptical reflector which has a location of the lamp 11 as one focus and a point at which light is collected as the other focus. Alternatively, the reflecting mirror 13 may be implemented by a parabolic reflector which has the location of the lamp 11 as a focus and reflects light emitted from the lamp 11 to be parallel. In FIG. 3, the elliptical reflector is used as the reflecting mirror 13. When the parabolic reflector is used as the reflecting mirror 13, a lens for focusing light is further required.

A collimating lens 14 is provided on an optical path between the light source 10 and the color splitter 15 and collimates incident light. When a distance between the light source 10 and a focus "f" at which light radiated from the light source 10 is collected is represented by P, it is preferable, but not necessary, that the collimating lens 14 is disposed at a position separated from the focus "f" by P/5. Such a disposition of the collimating lens 14 can miniaturize an optical system.

At least one filter having a slit to adjust a divergence angle of incident light may be disposed on an optical path between the light source 10 and the color splitter 15. The filter may be a spatial filter 5, which is preferably, but not necessarily, installed at the focus "f" of the light source 10.

The color splitter 15 splits white light radiated from the light source 10 into at least two colors and may include at least two dichroic filters which slant at different angles with respect to the axis of incident light.

In the projection system according to the first embodiment of the present invention shown in FIG. 3, the color splitter 15 includes first and second dichroic filters 15a and 15b. The first dichroic filter 15a reflects light in a first wavelength range of incident light and transmits the incident light excluding the light in the first wavelength range. The second dichroic filter 15b reflects light in a second wavelength range of incident light and transmits the incident light excluding the light in the second wavelength range.

Figure 4A:
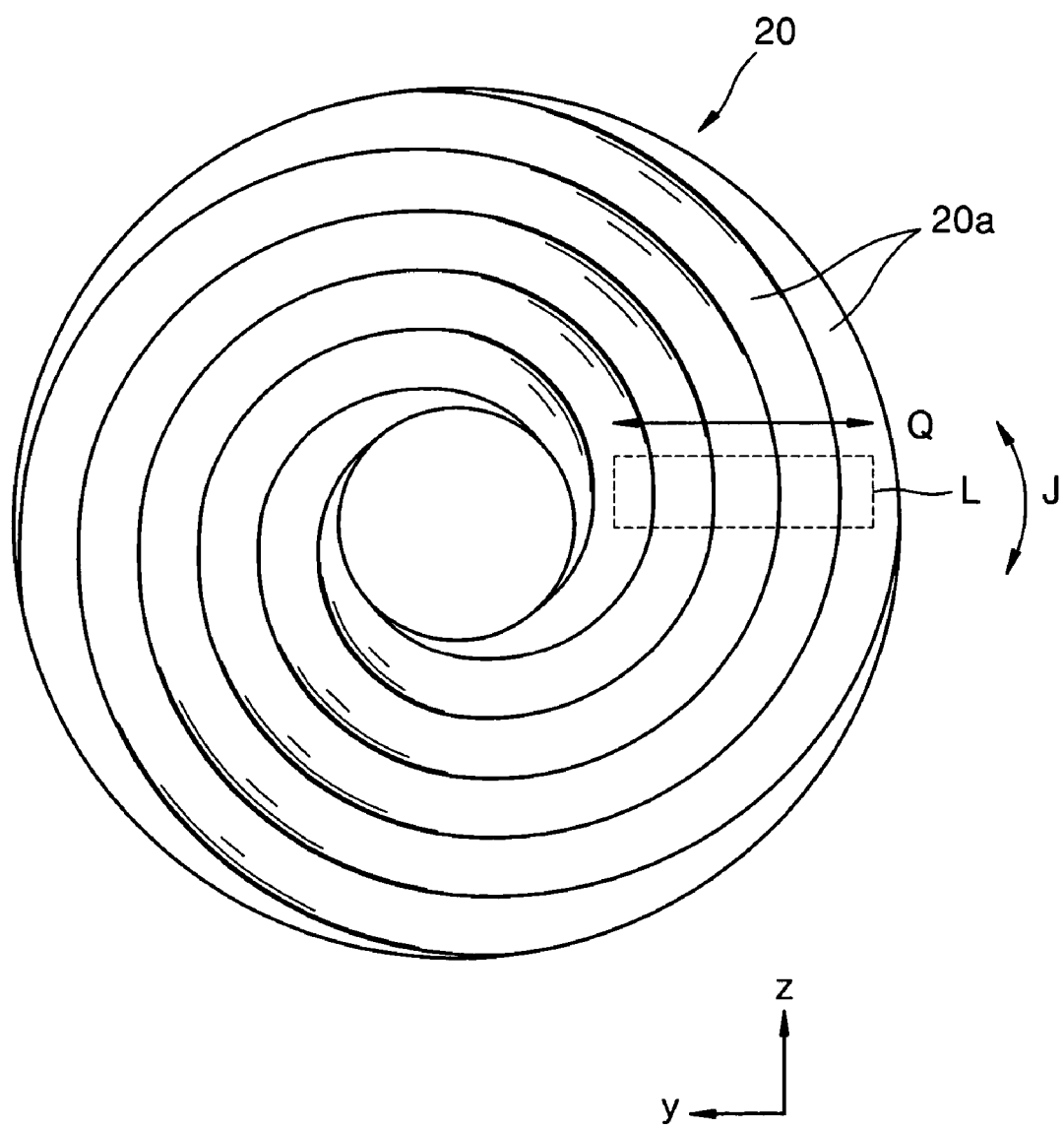
FIGS. 4A and 4B show an example of a scrolling unit used by a projection system according to the present invention.

The scrolling unit 20 includes at least one lens cell 20a which separates incident light into a plurality of beams and is structured such that the rotary motion of the scrolling unit 20 is converted into the rectilinear motion of a lens array in an area through which the incident light passes so as to scroll the incident light. Referring to FIG. 4A, the scrolling unit 20 may include at least one spiral lens disk in which at least one cylindrical lens cell 20a is arranged in a spiral pattern. The scrolling unit 20 can be rotated around a predetermined pivot. When the scrolling unit 20 rotates in a J direction, a lens array in an area of the scrolling unit 20 through which incident light L passes performs a rectilinear motion in a Q direction so that the incident light L is scrolled.

When the lens array performs a rectilinear motion in the Q direction, an effect as if the incident light L performs a rectilinear motion in an opposite direction to the Q direction can be obtained. The rectilinear motion is performed in a direction going far from or coming near to the pivot of the scrolling unit 20. In other words, as shown in FIG. 4B, when the scrolling unit 20 rotates in the J direction, an effect as if the incident light L performs a rectilinear motion in a direction going far from or coming near to the pivot of the scrolling unit 20 is obtained.

Figure 4B:
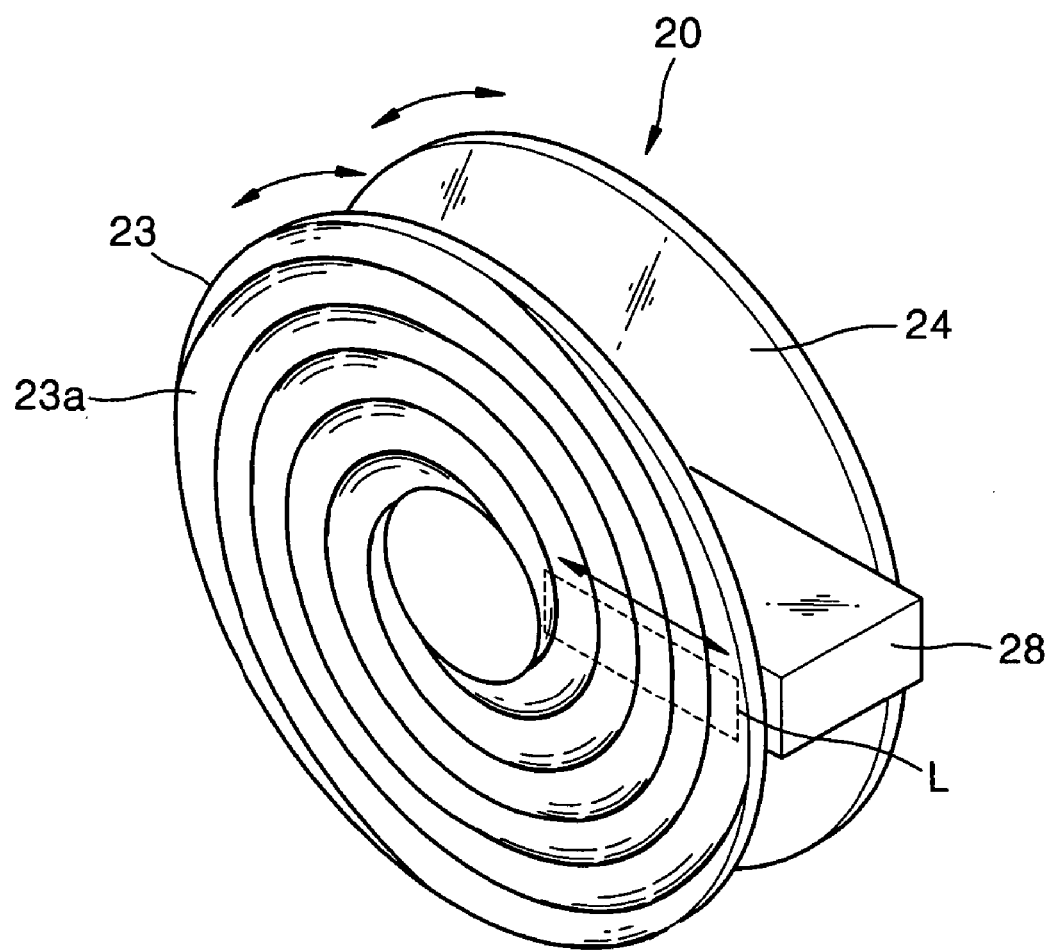

Referring to FIG. 4B, the scrolling unit 20 includes first and second spiral lens disks 23 and 24 separated from each other by a predetermined distance and a light guide plate or a glass rod 28 disposed between the first and second spiral lens disks 23 and 24. A cylindrical lens cell 23a is arranged in a spiral pattern on at least one side of the first spiral lens disk 23. Similarly, a cylindrical lens cell (not shown) is arranged in a spiral pattern on at least one side of the second spiral lens disk 24. A cross-section of each of the spiral lens disks 23 and 24 has a structure of a cylindrical lens array.

The first and second spiral lens disks 23 and 24 are installed rotatably. Light transmitted by the first spiral lens disk 23 is incident onto the second first spiral lens disk 24. The light guide plate or glass rod 28 and the second spiral lens disk 24 prevent the light from diverging due to the first spiral lens disk 23.

A first cylinder lens 16 is disposed between the color splitter 15 and the scrolling unit 20. A second cylinder lens 17, first and second fly-eye lens arrays 25 and 27, and the polarization converter 30 are disposed on an optical path between the scrolling unit 20 and the color selector 32. The first and second fly-eye lens arrays 25 and 27 include lens cells 25a and 27a arranged in two dimensions. The second cylinder lens 17 may be disposed next to the scrolling unit 20 or between the first and second fly-eye lens arrays 25 and 27. It is preferable, but not necessary, that the polarization converter 30 is disposed between the light source 10 and the color splitter 15, but the polarization converter 30 may be disposed next to the second fly-eye lens array 27.

In addition, the projection system includes a relay lens 34 which transfers light transmitted by the second fly-eye lens array 27 to different areas on a light valve according to color and an image combiner 35 which reflects or transmits light transmitted by the color selector 32 according to a polarization direction to transfer the light to at least two light valves and mixes images respectively formed by the at least two light valves. The at least two light valves include, for example, first and second light valves 38 and 40. The image combiner 35 may be implemented by a polarizing beam splitter or a wire grid polarizing beam splitter, which transmits or reflects incident light according to a polarization direction. Each of the first and second light valves 38 and 40 may be implemented by a liquid crystal display (LCD) or a liquid crystal on silicon (LCOS).

The following description concerns the effects of the projection system according to the first embodiment of the present invention.

Light emitted from the light source 10 is converted into light having a first polarization by the polarization converter 30, then collimated by the collimating lens 14, and then incident onto the color splitter 15. Here, the color splitter 15 is assumed to include the first and second dichroic filters 15a and 15b which slant at different angles. Light having the first polarization is split into light E in the first wavelength range and light F in the second wavelength range by the first and second dichroic filters 15a and 15b. The light E in the first wavelength range includes a first color light I, for example, a B light, and a second color light II, for example, a G light. The light F in the second wavelength range includes a third color light III, for example, a yellow (Y) light, and a fourth color light IV, for example, an R light.

Figure 5A:
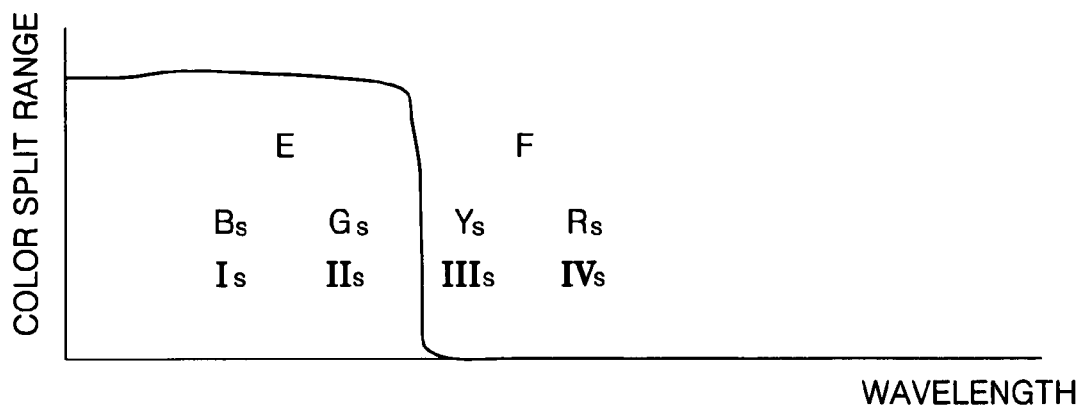
FIGS. 5A through 5C illustrate a method of splitting light into a first color light group and a second color light group using color splitting and polarization splitting performed by a projection system according to the present invention.

As shown in FIG. 5A, for example, the first dichroic filter 15a reflects the light E in the first wavelength range including a Y light's wavelength and an R light's wavelength and transmits the light F in the second wavelength range including a B light's wavelength and a G light's wavelength. The second dichroic filter 15b transmits the light E in the first wavelength range and reflects the light F in the second wavelength range. The second dichroic filter 15b may be replaced by a total reflection mirror.

As described above, the incident light is split into the light in the first wavelength range and the light in the second wavelength range by the first and second dichroic filters 15a and 15b. The first wavelength range and the light in the second wavelength range are decreased in width by the first cylinder lens 16 and then incident onto the scrolling unit 20. Light output from the scrolling unit 20 is collimated by the second cylinder lens 17. The light transmitted by the scrolling unit 20 is formed in a color line on each lens cell 25a of the first fly-eye lens array 25. The second fly-eye lens array 27 and the relay lens 34 make the light transferred to different areas on a light valve according to color so that color bars are formed on the light valve.

Here, a color line is formed in each lens cell 20a of the scrolling unit 20 and then directed onto each lens cell 25a of the first fly-eye lens array 25. Accordingly, it is preferable, but not necessary, that a lens cell occupied by light passing through the scrolling unit 20 corresponds one-to-one to a row array of the first and second fly-eye lens arrays 25 and 27. In other words, when the number of lens cells occupied by the light passing through the scrolling unit 20 is 4, it is preferable, but not necessary, that the number of row arrays of the first and second fly-eye lens arrays 34 and 35 is 4.

The color selector 32 selectively converts the polarization direction of light having a predetermined wavelength of the light E in the first wavelength range and the light F in the second wavelength range. Preferably, but not necessarily, the color selector 32 converts the polarization direction of at least some of the light E in the first wavelength range and the light F in the second wavelength range. In other words, the color selector 32 converts the polarization direction of some light in the light E in the first wavelength range and the polarization direction of some light in the light F in the second wavelength range, or converts the polarization direction of some of the light in each of the E and F ranges.

Figure 5B:
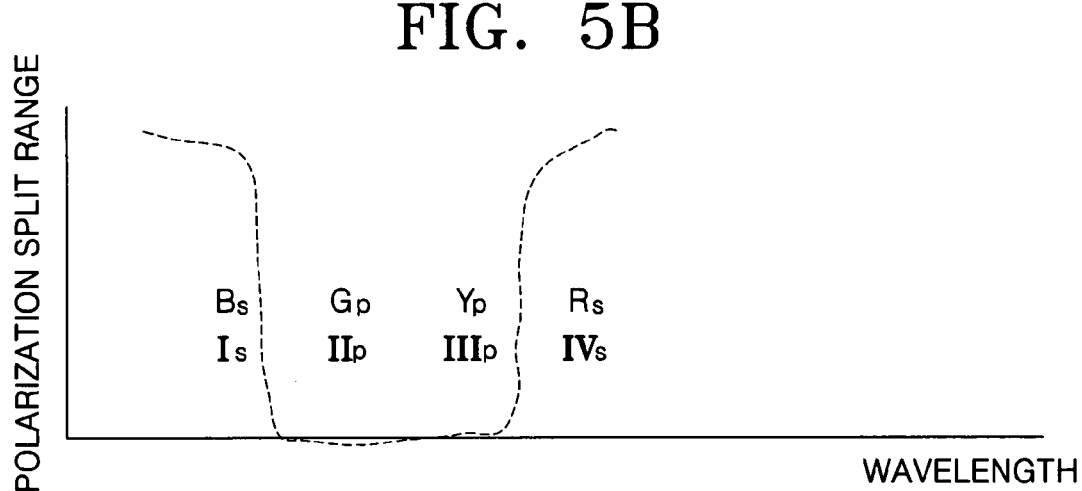

As described above, the color selector 32 can split incident light into a first color light group and a second color light group according to polarization directions by selectively converting the polarization direction of the incident light according to color. For example, as shown in FIG. 5B, the color selector 32 converts the polarization direction of the second color light II, for example, a G light, in the light E in the first wavelength range and the polarization direction of the third color light III, for example, a Y light, in the light F in the second wavelength range into a second polarization, for example, P-polarization.

Figure 5C:
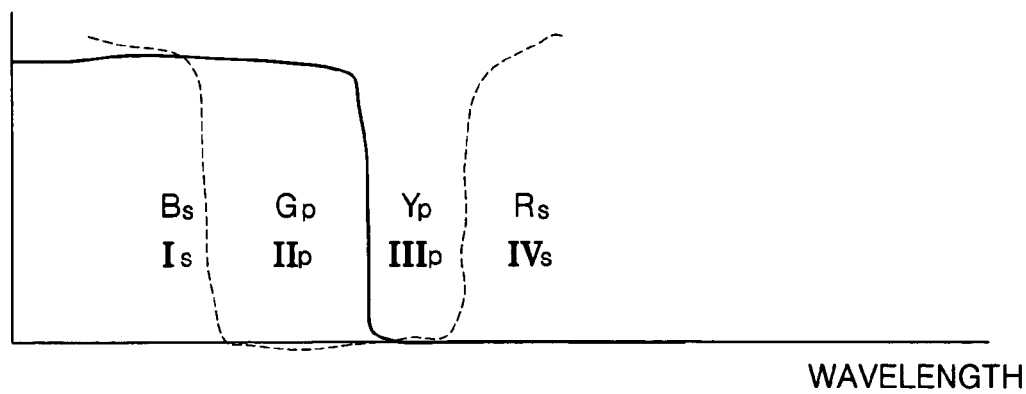

Consequently, as shown in FIG. 5C, the color selector 32 splits the E and F light having an S-polarization after passing through the polarization converter 30 and the color splitter 15 into an S-polarized first color light $I_S$, e.g., an S-polarized B light $B_S$, a P-polarized second color light $II_P$, e.g., a P-polarized G light $G_P$, a P-polarized third color light $III_P$, e.g., a P-polarized Y light $Y_P$, and an S-polarized fourth color light $IV_S$, e.g., an S-polarized R light $R_S$. Here, the first color light group includes the S-polarized first and fourth color light $I_S$ and $IV_S$, and the second color light group includes the P-polarized second and third color light $II_P$ and $III_P$.

The first through fourth color light $I_S$, $II_P$, $III_P$, and $IV_S$ are incident onto the image combiner 35 via the relay lens 34. For example, the image combiner 35 transmits the first color light group having the S-polarization to the first light valve 38 and reflects the second color light group having the P-polarization to the second light valve 40. In other words, the S-polarized first and fourth color light $I_S$ and $IV_S$ are transmitted to the first light valve 38, and the P-polarized second and third color light $II_P$ and $III_P$ are reflected to the second light valve 40.

Figure 6:
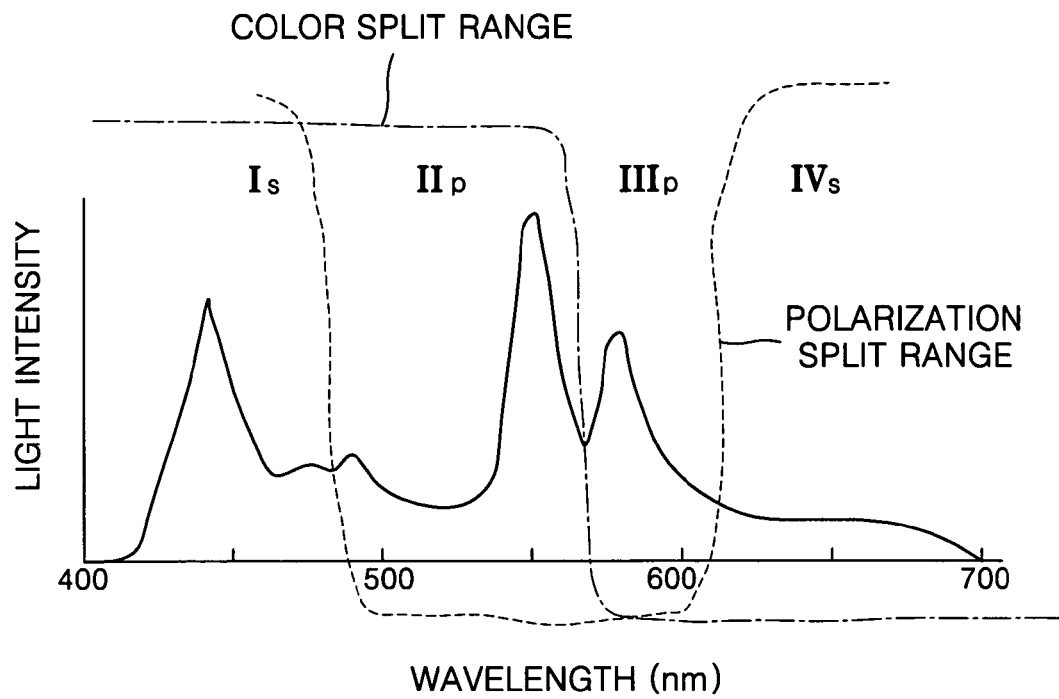
FIG. 6 is a graph showing a distribution of light strength, a color split range, and a polarization split range according to wavelengths in a projection system according to the present invention.

The S-polarized first and fourth color light $I_S$ and $IV_S$ are transferred to different areas of the first light valve 38 according to color due to the first and second fly-eye lens arrays 25 and 27 and the relay lens 34, thereby forming first and fourth color bars. Similarly, the P-polarized second and third color light $II_P$ and $III_P$ are transferred to different areas of the second light valve 40 according to color, thereby forming second and third color bars. Here, the first through fourth color bars are denoted by the same reference characters as the polarized first through fourth color light $I_S$, $II_P$, $III_P$, and $IV_S$, respectively. FIG. 6 is a graph showing a change in light strength, a color split range defined by the first and second dichroic filters 15a and 15b, and a polarization split range defined by the color selector 32 according to wavelengths.

Figure 7A:
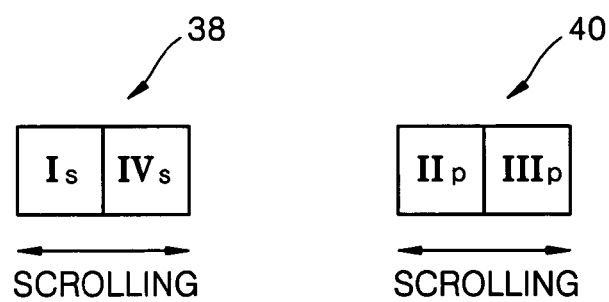
FIGS. 7A and 7B show a first color bar group and a second color bar group formed by a projection system according to the present invention and illustrate a scrolling operation.
Figure 7B:
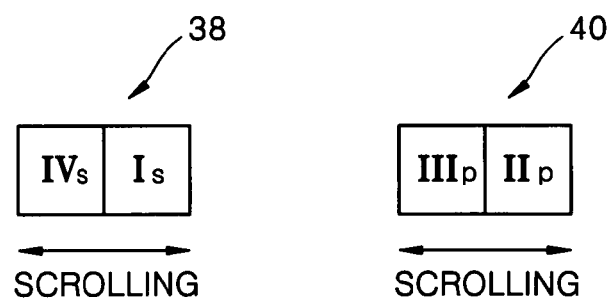

Referring to FIGS. 7A and 7B, as the scrolling unit 20 rotates, the first and fourth color bars $I_S$ and $IV_S$ are periodically scrolled on the first light valve 38 and the second and third color bars $II_P$ and $III_P$ are periodically scrolled on the second light valve 40. When the first and fourth color bars $I_S$ and $IV_S$ and the second and third color bars $II_P$ and $III_P$ are scrolled one time, a color image of a single frame is formed. The period of a scrolling operation is determined by the width of the lens cell 20a of the scrolling unit 20 and the rotary frequency of the scrolling unit 20.

Light reflected from the first and second light valves 38 and 40 are enlarged and projected onto the screen 50 via the image combiner 35 and the projection lens unit 45. Here, the first light valve 38 processes the first and fourth color bars $I_S$ and $IV_S$ according to an image signal to form a first image, and the second light valve 40 processes the second and third color bars $II_P$ and $III_P$ according to the image signal to form a second image. The first and second images are mixed by the image combiner 35.

In addition, as the scrolling unit 20 rotates, the first and fourth color bars $I_S$ and $IV_S$ are scrolled, and simultaneously, the second and third color bars $II_P$ and $III_P$ are scrolled, so that a color image is formed.

In the meantime, an analyzer 43 may be further provided on an optical path between the image combiner 35 and the projection lens unit 45 to increase the quality of a color image. The analyzer 43 may be designed to convert the polarization direction of mixed light output from the image combiner 35 according to color for analysis.

Figure 8:
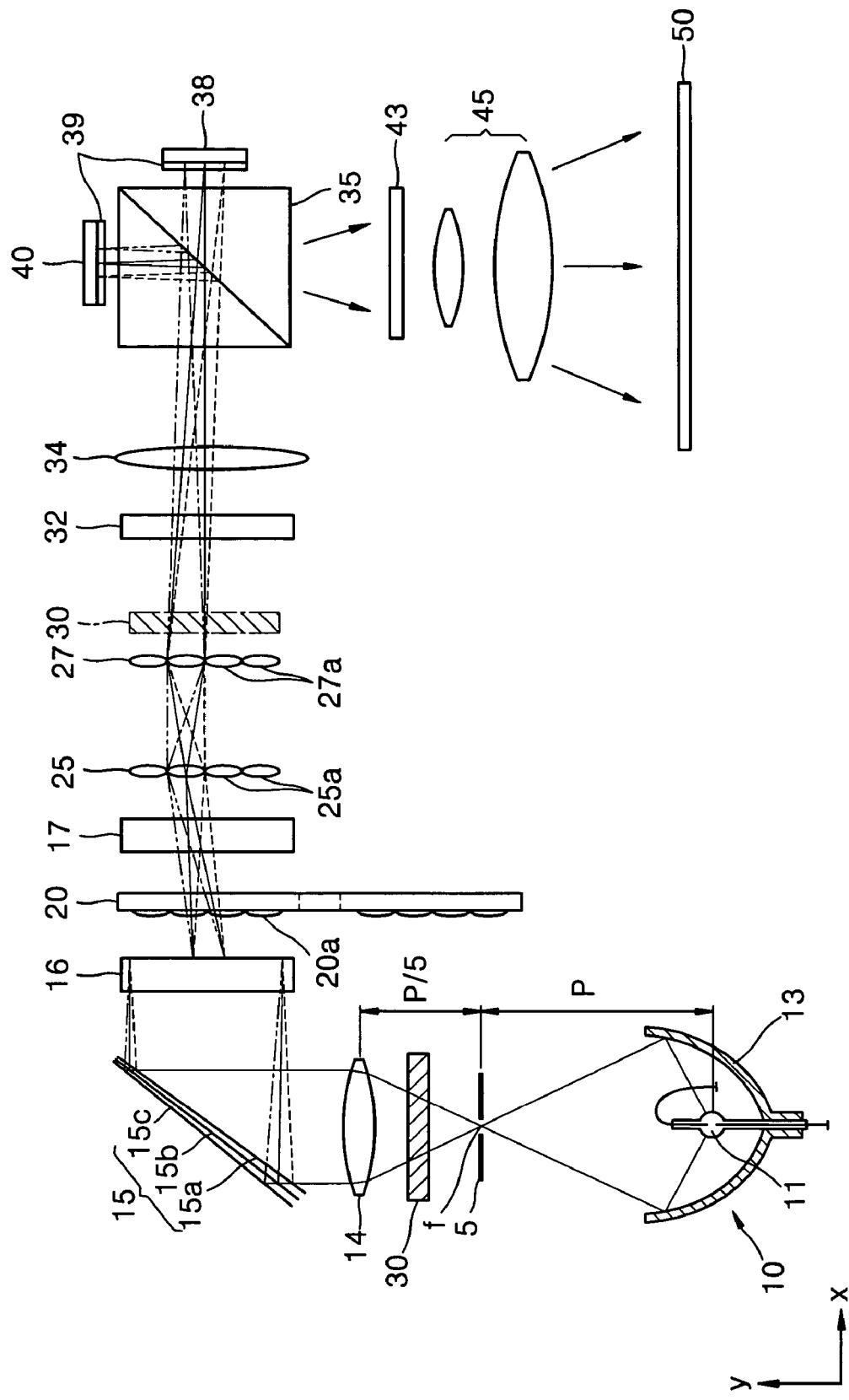
FIG. 8 is a diagram showing a modification of the projection system according to the first embodiment of the present invention.

As shown in FIG. 8, in a modification of the projection system according to the first embodiment of the present invention, the color splitter 15 may include first, second, and third dichroic filters 15a, 15b, and 15c. The following description concerns an operation of forming a color image when the color splitter 15 including the first through third dichroic filters 15a, 15b, and 15c.

Light emitted from the light source 10 is converted into light having the first polarization, e.g., the S-polarization, by the polarization converter 30. The first dichroic filter 15a reflects the light E in the first wavelength range in the light having the first polarization and transmits light in other wavelength range. The second dichroic filter 15b reflects the light F in the second wavelength range and transmits light in other wavelength range. The third dichroic filter 15c reflects light H in a third wavelength range and transmits light in other wavelength range. The third dichroic filter 15c may be replaced by a total reflection mirror.

Figure 9A:
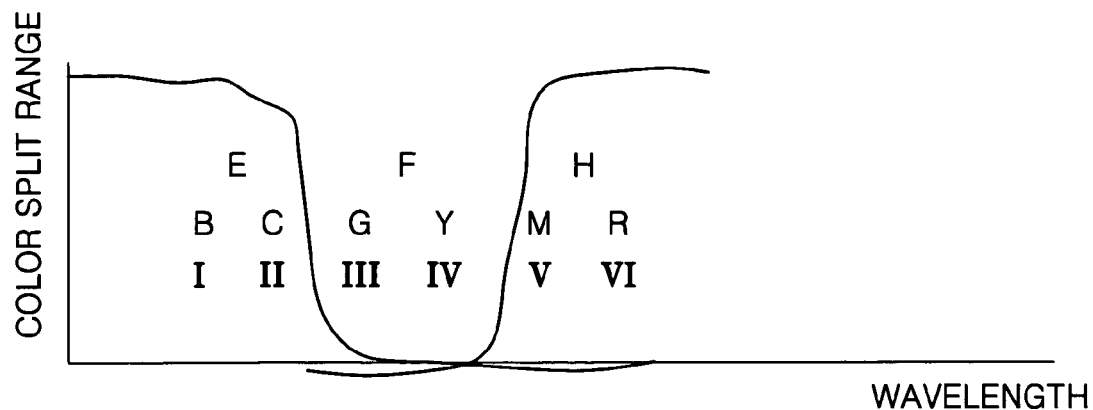
FIGS. 9A through 9C illustrate a procedure in which the projection system shown in FIG. 8 forms a first color light group and a second color light group.

In other words, as shown in FIG. 9A, the light emitted from the light source 10 is split into the light E, F, and H in the respective first through third wavelength ranges by the first through third dichroic filters 15a, 15b, and 15c. The light E in the first wavelength range includes the first color light I and the second color light II. The light F in the second wavelength range includes the third color light III and the fourth color light IV. The light H in the third wavelength range includes a fifth color light V and a sixth color light VI. For example, the light E in the first wavelength range includes a B light and cyan (C) light, the light F in the second wavelength range includes a G light and Y light, and the light H in the third wavelength range includes a magenta (M) light and an R light.

The color selector 32 converts the polarization direction of at least one color light among the light E, F, and H in the respective first through third wavelength ranges. Preferably, but not necessarily, the color selector 32 converts the polarization direction of at least one color light in at least one of the light E, F, and H into the second polarization, e.g., the P-polarization.

Figure 9B:
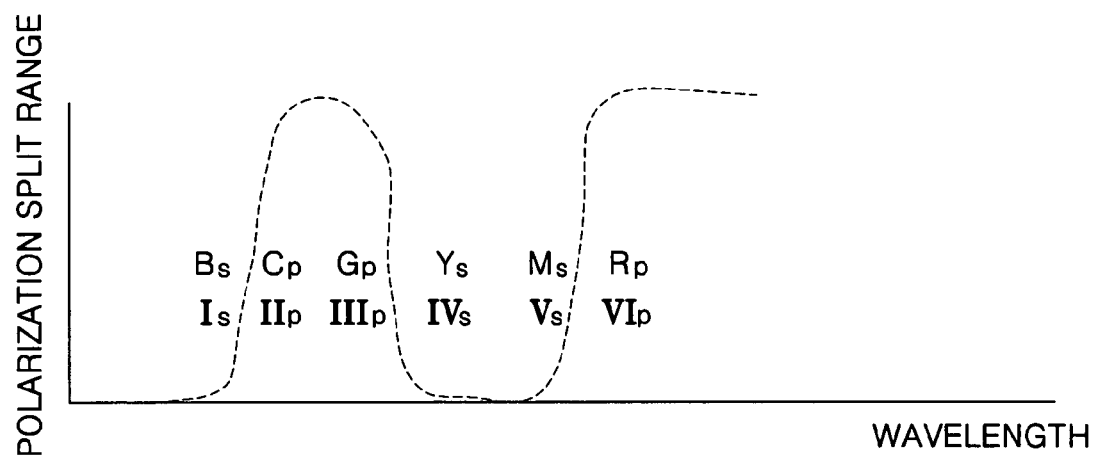

More specifically, as shown in FIG. 9B, the color selector 32 converts the polarization direction of the first or second color light in the light E in the first wavelength range. For example, the color selector 32 converts the polarization direction of the C light into the P-polarization. The color selector 32 may also convert the polarization direction of the third or fourth color light in the light F in the second wavelength range. For example, the color selector 32 converts the polarization direction of the G light into the P-polarization. The color selector 32 may also convert the polarization direction of the fifth or sixth color light in the light H in the third wavelength range. For example, the color selector 32 converts the polarization direction of the R light into the P-polarization.

Figure 9C:
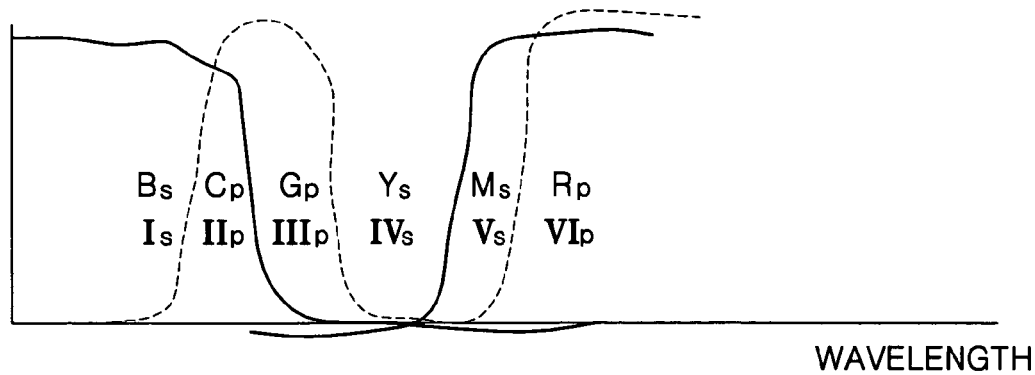

Consequently, the color selector 32 converts the first color light in the light E in the first wavelength into an S-polarized first light $I_S$, the second color light in the light E in the first wavelength into a P-polarized second light $II_P$, the third color light in the light F in the second wavelength into a P-polarized third light $III_P$, the fourth color light in the light F in the second wavelength into an S-polarized fourth light $IV_S$, the fifth color light in the light H in the third wavelength into an S-polarized fifth light $V_S$, and the sixth color light in the light H in the third wavelength into a P-polarized sixth light $VI_P$. More specifically, referring to FIG. 9C, an S-polarized B light $B_S$, a P-polarized C light $C_P$, a P-polarized G light $G_P$, an S-polarized Y light $Y_S$, an S-polarized M light $M_S$, and a P-polarized R light $R_P$ are generated. Here, the first color light group includes the S-polarized B, Y, and M lights $B_S$, $Y_S$, and $M_S$, and the second color light group includes the P-polarized C, G, and R light $C_P$, $G_P$, and $R_P$.

Figure 10A:
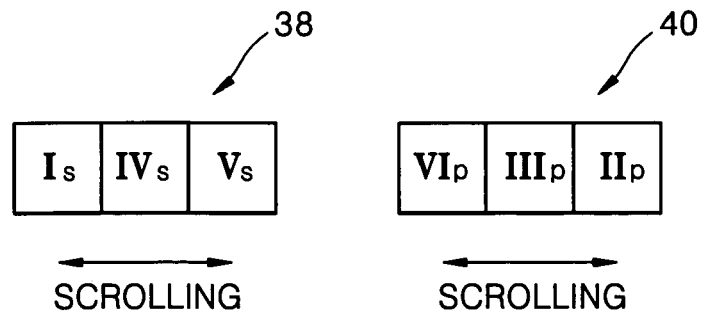
FIGS. 10A through 10C show a first color bar group and a second color bar group formed by the projection system shown in FIG. 8 and illustrate a scrolling operation.

The first through sixth color light $I_S$, $II_P$, $III_P$, $IV_S$, $V_S$, and $VI_P$ are reflected or transmitted by the image combiner 35 according to polarization directions so that the first color light group is incident onto the first light valve 38 and the second color light group is incident onto the second light valve 40. For example, as shown in FIG. 10A, the image combiner 35 transmits the S-polarized first, fourth, and fifth color light $I_S$, $IV_S$, and $V_S$ to the first light valve 38 and reflects the P-polarized second, third, and sixth color light $II_P$, $III_P$, and $VI_P$ to the second light valve 40. The first through sixth color light $I_S$, $II_P$, $III_P$, $IV_S$, $V_S$, and $VI_P$ are transferred to different areas of the first and second light valves 38 and 40 according to color due to the first and second fly-eye lens arrays 25 and 27 and the relay lens 34, so that first through sixth color bars are formed. Here, the first through sixth color bars are denoted by the same reference characters as the polarized first through sixth color light $I_S$, $II_P$, $III_P$, $IV_S$, $V_S$, and $VI_P$, respectively.

Figure 10B:
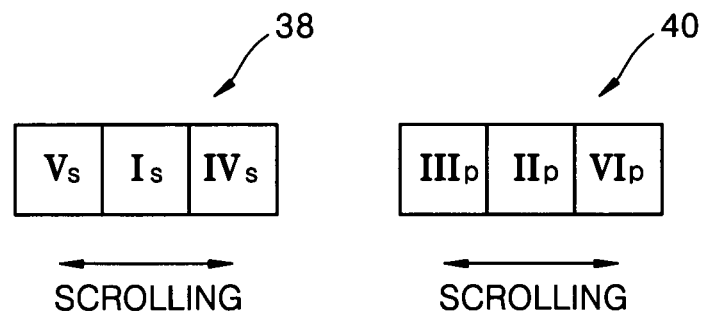
Figure 10C:
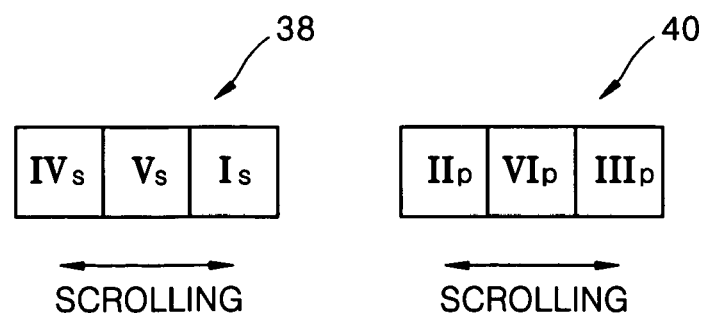

As the scrolling unit 20 rotates, as shown in FIGS. 10A through 10C, the first, fourth, and fifth color bars $I_S$, $IV_S$, and $V_S$ are scrolled in a cycle like ($I_S$, $IV_S$, $V_S$)→($V_S$, $I_S$, $IV_S$)→($IV_S$, $V_S$, $I_S$), and simultaneously, the second, third, and sixth color bars $II_P$, $III_P$, and $VI_P$ are scrolled in a cycle like ($II_P$, $III_P$, $VI_P$)→($VI_P$, $II_P$, $III_P$)→($III_P$, $VI_P$, $II_P$). Such a scrolling operation is periodically performed. When the first through sixth color bars $I_S$, $II_P$, $III_P$, $IV_S$, $V_S$, and $VI_P$ are completely scrolled in one cycle, a color image of a single frame is formed.

A procedure in which color bars are scrolled by the scrolling unit 20 in the projection system shown in FIG. 8 will be described with reference with FIGS. 11A through 11C. For clarity of the description, only the scrolling unit 20, the first and second fly-eye lens arrays 25 and 27, and the relay lens 34 are illustrated.

Figure 11A:
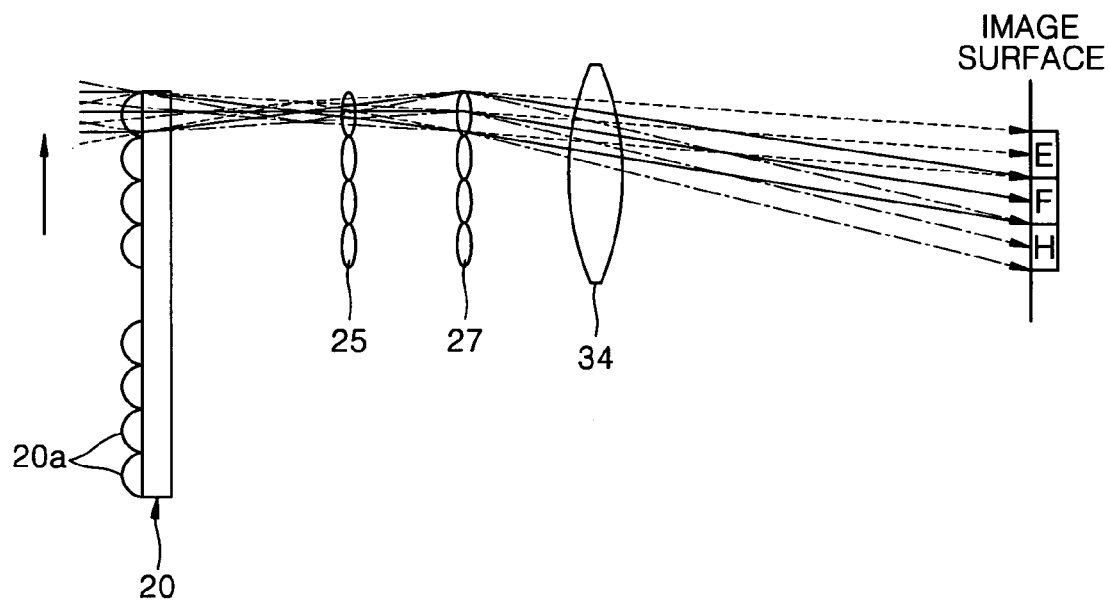
FIGS. 11A through 11C illustrate a color scrolling operation of a scrolling unit used by a projection system according to the present invention.
Figure 11B:
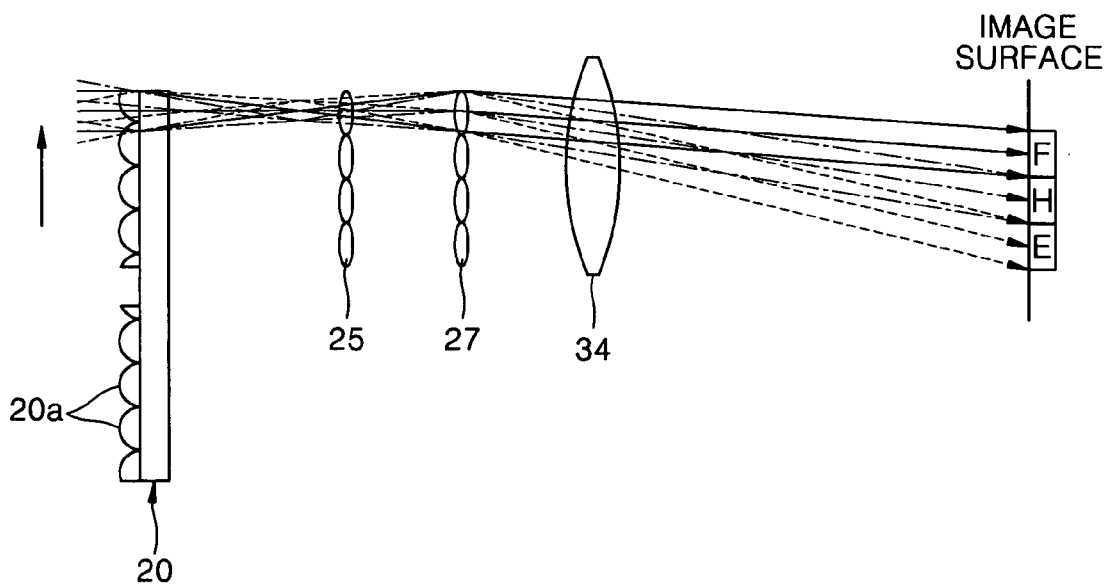
Figure 11C:
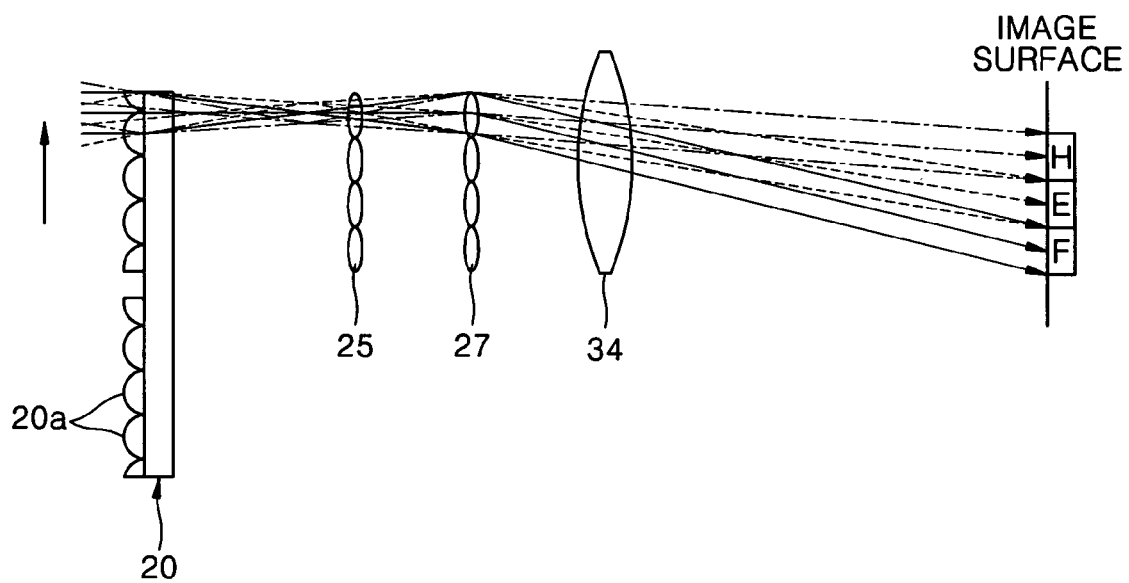

Referring to FIG. 11A, the light E, F, and H in the respective first through third wavelength ranges split by the color splitter 15 are separately focused on an image surface in order of, for example, E, F, and H, after passing through the scrolling unit 20, the first and second fly-eye lens arrays 25 and 27, and the relay lens 34. Thereafter, as the scrolling unit 20 rotates, a lens array in a current area of the scrolling unit 20 through which incident light passes gradually moves up or down. Accordingly, a focus position of each light passing through the scrolling unit 20 changes as the scrolling unit 20 rotates. Consequently, the E, F, and H light is arranged in order of F, H, and E, as shown in FIG. 11B. As the scrolling unit 20 continuously rotates, the E, F, and H light is arranged in order of H, E, and F, as shown in FIG. 11C. Such a scrolling operation is repeated periodically. The E, F, and H light in the respective first through third wavelength ranges is separated into different paths, respectively, according to polarization directions by the image combiner 35 and then incident onto the first and second light valves 38 and 40.

FIGS. 10A through 10C illustrate a case where the color selector 32 converts the polarization direction of at least some light of each of the E, F, and H light in the respective first through third wavelength ranges. However, a wavelength range of light whose polarization direction is converted can be freely selected using the color selector 32. For example, the polarization direction of the first color light in the light E in the first wavelength range and the polarization direction of the third color light in the light F in the second wavelength range may be converted while the polarization direction of the light H in the third wavelength range is maintained.

Light which is converted from the first polarization into the second polarization by the color selector 32 is incident onto the first light valve 38 (or the second light valve 40), and light whose polarization direction is not converted is incident onto the second light valve 40 (or the first light valve 38 ), such that all light which is converted is incident on one light valve, and all light which is not converted is incident on the other light valve.

Figure 12A:
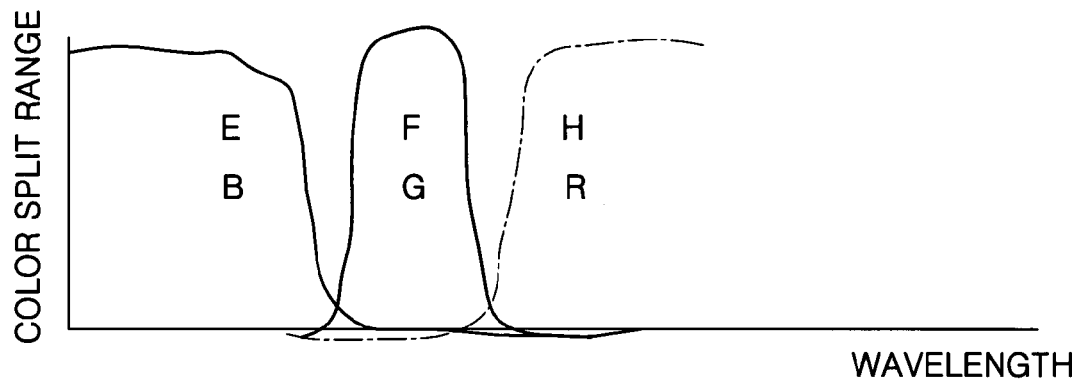
FIGS. 12A through 12C illustrate an example in which a projection system according to the present invention forms a first color light group and a second color light group.
Figure 12B:
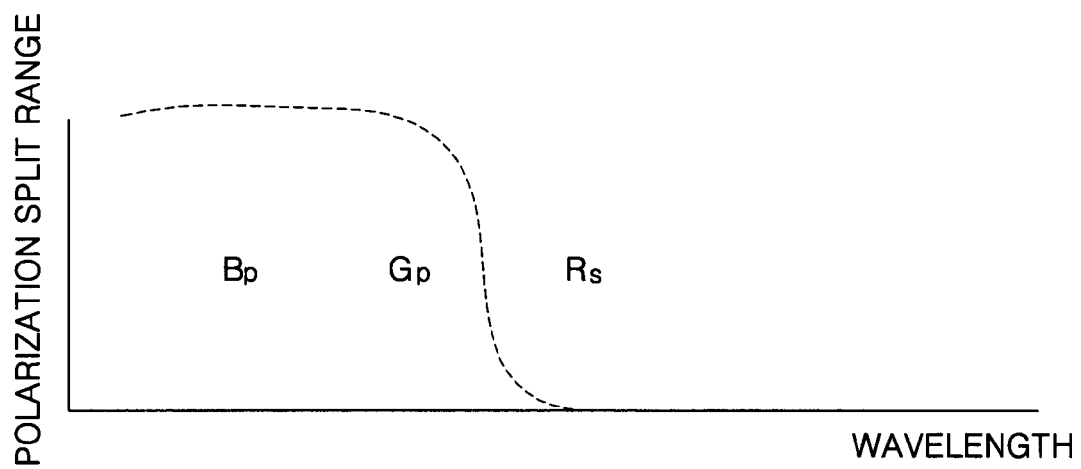
Figure 12C:
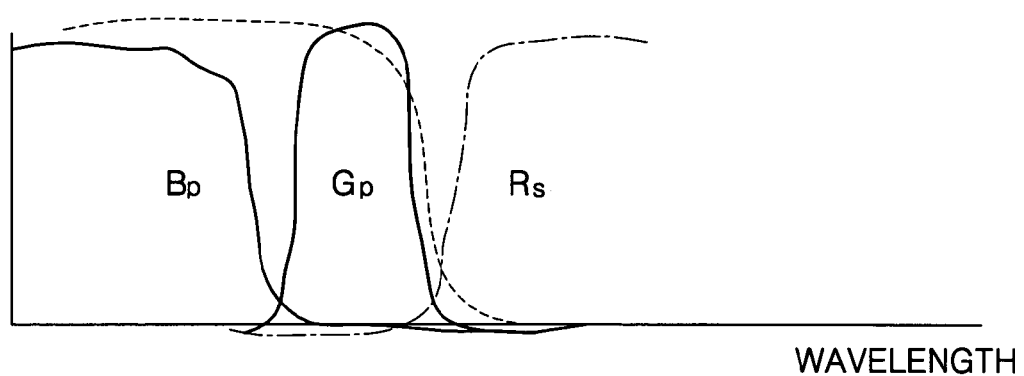

FIGS. 12A through 12C show another case of splitting light emitted from the light source 10 into the first color light group and the second color light group using the color splitter 15, the polarization converter 30, and the color selector 32.

Light emitted from the light source 10 is converted into light having one polarization, for example, an S-polarization, by the polarization converter 30. Referring to FIG. 12A, the light emitted from the light source 10 may be split into the light E in the first wavelength range, e.g., a B light, the light F in the second wavelength range, e.g., a G light, and the light H in the third wavelength range, e.g., an R light, by the first through third dichroic filters 15a through 15c. Next, referring to FIG. 12B, the color selector 32 converts the light E and F in the respective first and second wavelength ranges, e.g., the B and G light, into P-polarized light and maintains the S-polarization of the light H in the third wavelength range.

Figure 13A:
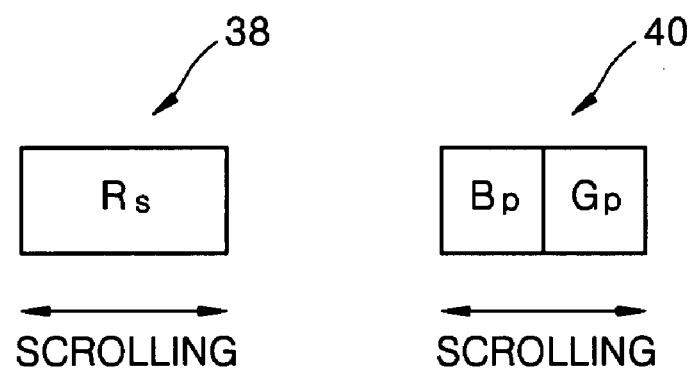
FIGS. 13A and 13B illustrate a procedure of scrolling a first color bar group and a second color bar group which are formed in the example shown in FIGS. 12A through 12C.
Figure 13B:
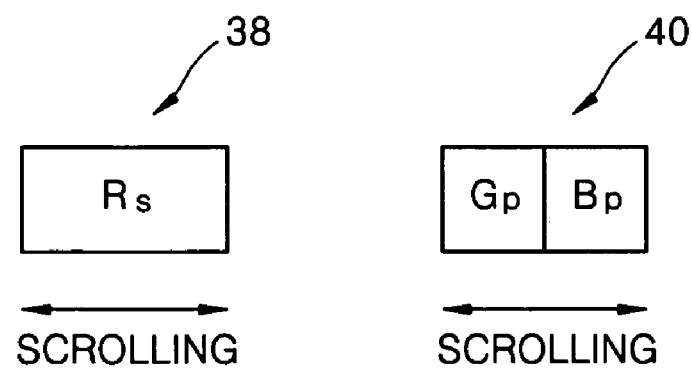

Referring to FIG. 12C, white light emitted from the light source 10 is eventually split into a P-polarized B light $B_P$, a P-polarized G light $G_P$, and an S-polarized R light $R_S$. Next, as shown in FIG. 13A, the S-polarized R light $R_S$ is transmitted by the image combiner 35 to the first light valve 38, and the P-polarized B and G light $B_P$ and $G_P$ are reflected by the image combiner 35 to the second light valve 40. Thereafter, as the scrolling unit 20 rotates, as shown in FIG. 13B, color bars formed on the first and second light valves 38 and 40 are scrolled, thereby forming a color image.

As described above, white light emitted from the light source 10 is converted into light having one predetermined polarization, then primarily split into a plurality of color light by the color splitter 15, and then secondarily split into the first color light group and the second color light group by the color selector 32. The first and second color light groups may be respectively transferred to the first and second light valves 38 and 40.

Consequently, the white light can be split into a desired number of colors using the color splitter 15, the polarization converter 30, and the color selector 32, and the split colors are scrolled, so that a color gamut can be increased. As a result, the range of expressible color is increased.

Referring back to FIG. 8, a ¼ wavelength plate 39 may be further disposed between the image combiner 35 and each of the first and second light valves 38 and 40. In this situation, after passing through the image combiner 35, the first color light group having the S-polarization is roughly converted into circularly polarized light by the ¼ wavelength plate 39 and then focused on the first light valve 38. In light which is polarization-modulated according to an image signal and the reflected by the first light valve 38, only light converted to have the P-polarization by the ¼ wavelength plate 39 is reflected by the image combiner 35 toward the projection lens unit 45. After passing through the image combiner 35, the second color light group having the P-polarization is roughly converted into circularly polarized light by the ¼ wavelength plate 39 and then focused on the second light valve 40. In light which is polarization-modulated according to the image signal and the reflected by the second light valve 40, only light converted to have the S-polarization by the ¼ wavelength plate 39 is transmitted by the image combiner 35 to the projection lens unit 45.

The ¼ wavelength plate 39 can be selectively provided according to a type of each of the first and second light valves 38 and 40.

Figure 14:
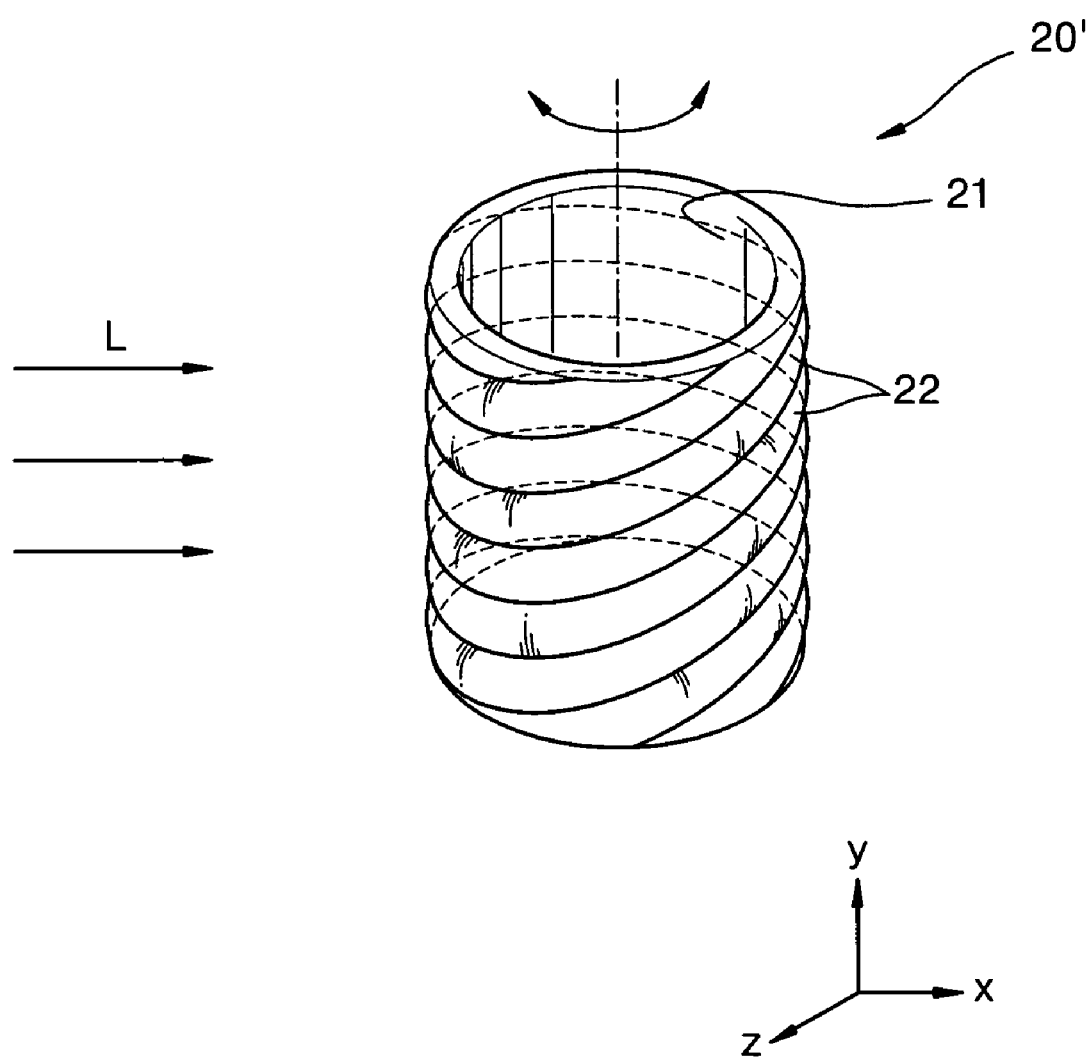
FIG. 14 shows another example of a scrolling unit used by a projection system according to the present invention.

FIG. 14 shows another example of a scrolling unit employed in the projection system according to the first embodiment of the present invention. Referring to FIG. 14, a scrolling unit 20' includes at least one lens cell 22 formed in a spiral pattern on a pillar surface 21. Preferably, but not necessarily, the lens cell 22 is a cylindrical lens cell. The pillar surface 21 may be cylindrical or polygonal. FIG. 14 shows the pillar surface 21 having a cylindrical shape.

Figure 15A:
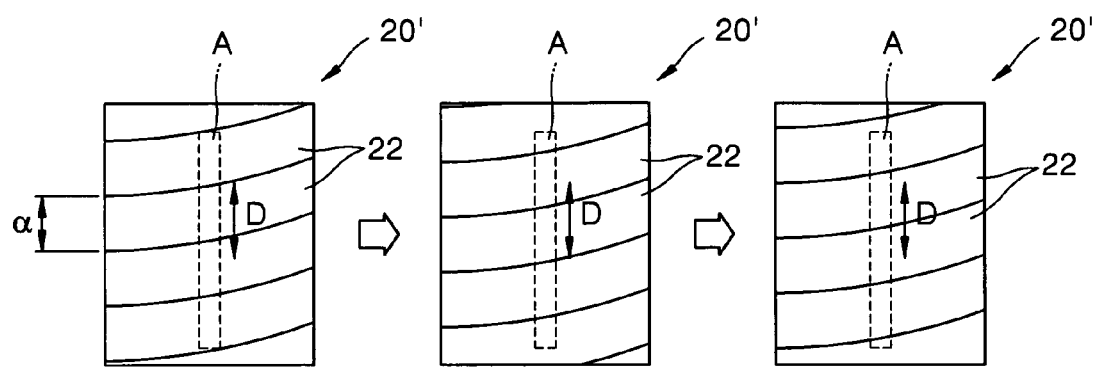
FIGS. 15A and 15B illustrate a scrolling operation according to the rotation of the scrolling unit shown in FIG. 14.
Figure 15B:
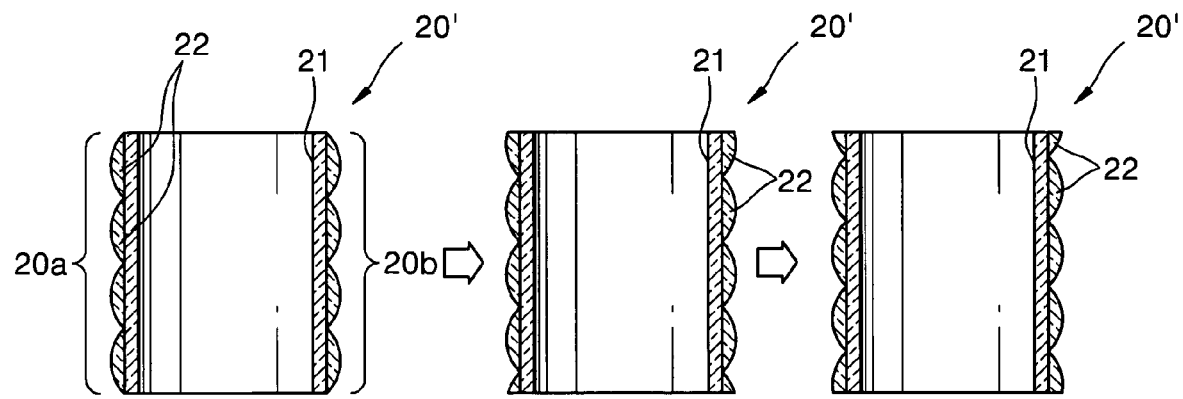

FIG. 15A is a front view of the scrolling unit 20'. FIG. 15B is a cross section taken along the area A of the scrolling unit 20' through which light L passes. As shown in FIG. 15B, the cross-section of the area A through which the light L passes has a structure of a cylinder lens array.

The scrolling unit 20' is rotatably installed. As shown in FIG. 15A, the rotary motion of the scrolling unit 20' is converted into a rectilinear motion (in a direction denoted by a reference character D) of a lens array in the area A. FIGS. 15A and 15B illustrate a rectilinear motion of the lens array in the area A through which the light L passes while the scrolling unit 20' is rotating.

Although one or more lens cells 22 are arranged in a spiral pattern in the scrolling unit 20', they have a cylinder lens array structure in the area A having a narrow width. As the scrolling unit 20' rotates, a position of a lens array through which light passes changes continuously and periodically. The rectilinear motion of the cylinder lens array is repeated with a period of a width α of a cross-section of the lens cell 22. Preferably, but not necessarily, the one or more lens cells 22 are arranged to slant at the same angle with respect to the pillar surface 21 so that the rectilinear motion of the lens array can be performed periodically when the scrolling unit 20' performs a rotary motion. The period of the rectilinear motion of the lens array can be controlled by adjusting the width α and the slope of the lens cell 22.

The scrolling unit 20' includes a first side 22a on which light is incident and a second side 22b through which the light is output from the scrolling unit 20'. Accordingly, the scrolling unit 20' having a cylindrical shape shows an effect as if light passes through two lenses. Each lens cell 22 on the first side 22a splits light into a plurality of light, which form a plurality of light spots on the second side 22b. The plurality of light is scrolled when the rotary motion of the scrolling unit 20' is converted into the rectilinear motion of the lens array. Instead of the scrolling unit 20, the scrolling unit 20' can be used in the projection systems shown in FIGS. 3 and 8.

Figure 16:
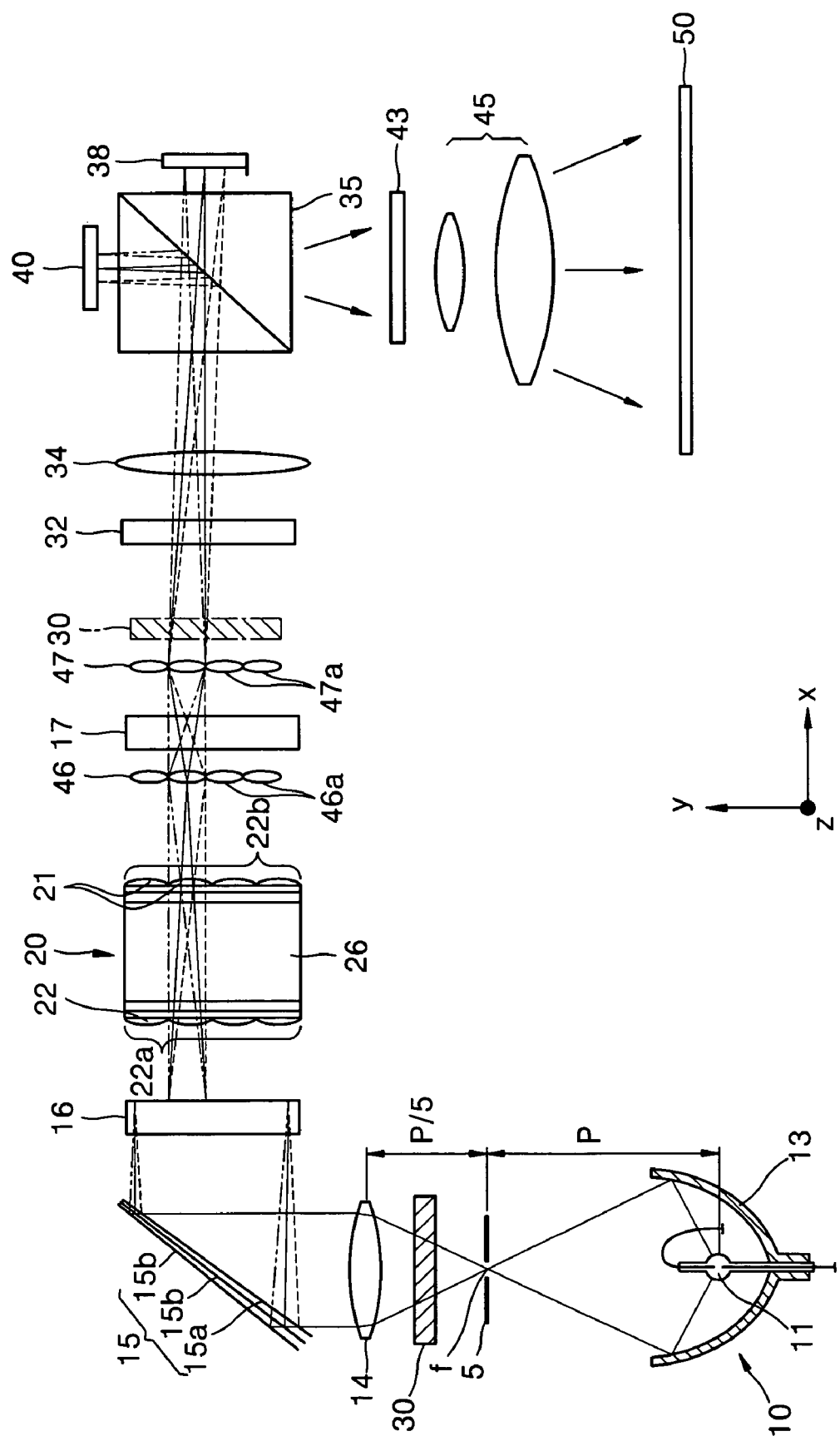
FIG. 16 is a diagram showing another modification of the projection system according to the first embodiment of the present invention.

Referring to FIG. 16, another modification of the projection system according to the first embodiment of the present invention includes a light source 10, a color splitter which splits light radiated from the light source 10 according to wavelengths, a scrolling unit 20' which splits incident light into a plurality of beams, scrolls the plurality of beams, and includes a light guide plate or a glass rod 26, at least two light valves which process the beams scrolled by the scrolling unit 20' according to an input image signal to form a color image, and a projection lens unit 45 which enlarges and projects the color image formed by the light valves onto a screen 50.

A first cylinder lens 16 is disposed before the scrolling unit 20' to reduce the width of light incident onto the scrolling unit 20', and a second cylinder lens 17 is disposed behind the scrolling unit 20' to collimate light incident from the scrolling unit 20'. In addition, a polarization converter 30 which converts light emitted from the light source 10 into light having the first polarization, e.g., an S-polarization, and a color selector 32 which selectively converts the polarization direction of only light in a predetermined wavelength range in the S-polarized light are provided. Here, in FIGS. 3, 8, and 16, members denoted by the same reference numerals perform the same functions and operations, and therefore, detailed descriptions thereof will be omitted.

When the scrolling unit 20' has a cylindrical shape and includes the glass rod or the light guide plate 26, first and second cylinder lens arrays 46 and 47 are disposed on an optical path between the scrolling unit 20' and the relay lens 34. The first cylinder lens array 46 include cylinder lens cells 46a arranged in parallel with each other, and the second cylinder lens array 47 include cylinder lens cells 47a arranged in parallel with each other. Although the first cylinder lens array 46 is disposed before the second cylinder lens 17 in FIG. 16, their positions can be switched.

The light guide plate 26 uniformly transmits light, which has passed through the first side 22a of the scrolling unit 20', in a predetermined direction. It is preferable, but not necessary, that the light guide plate 26 functions in a direction (i.e., a z-direction) perpendicular to a direction (i.e., a y-direction) of the rectilinear motion of a lens array of the scrolling unit 20' and to a direction (i.e., an x-direction) in which light proceeds. In addition, it is preferable, but not necessary, that the lens cells 46a and 47a of the first and second cylinder lens arrays 46 and 47 are arranged in a direction (i.e., the y-direction) perpendicular to the guiding direction of the light guide plate 26 (i.e., the z-direction) and to the proceeding direction of the light (i.e., the x-direction).

Light emitted from the light source 10 is converted into light having the first polarization by the polarization converter 30. The color splitter 15 including the first through third dichroic filters 15a through 15c splits the light having the first polarization into the light E, F, and H in the respective first through third wavelength ranges. Next, the color selector 32 converts at least partial color light in the light having the first polarization to have the second polarization, thereby splitting the light having the first polarization into the first color light group and the second color light group. For example, the first color light group having the S-polarization is transmitted by the image combiner 35 and incident onto the first light valve 38, and the second color light group having the P-polarization is reflected by the image combiner 38 and incident onto the second light valve 40.

As the scrolling unit 20' rotates, the first and second color light groups are simultaneously scrolled, and a first image processed by the first light valve 38 and a second image processed by the second light valve 40 are mixed by the image combiner 35, so that a color image is formed. The color image is enlarged and projected onto the screen 50 by the projection lens unit 45.

The projection system shown in FIG. 16 can perform the color splitting procedure and the polarization splitting procedure described with reference to FIGS. 9A through 9C and 12A through 12C. When the color splitter 15 including the first and second dichroic filters 15a and 15b is used in the projection system shown in FIG. 16, the projection system can perform the color splitting procedure and the polarization splitting procedure which has been described with reference to FIGS. 5A through 5C.

The following description concerns a projection system according to a second embodiment of the present invention.

Figure 17:
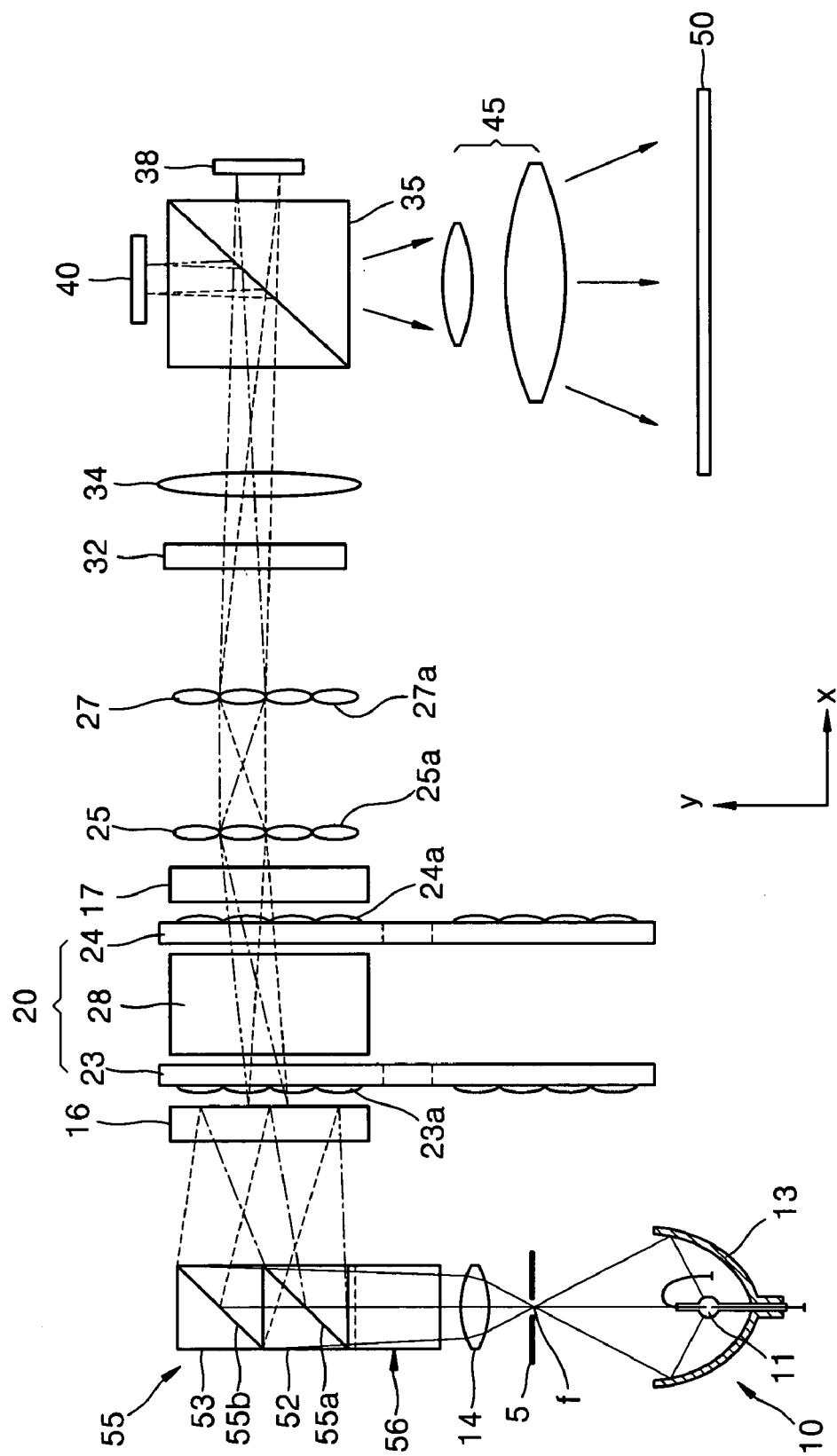
FIG. 17 is a diagram of a projection system according to a second embodiment of the present invention.

Referring to FIG. 17, the projection system according to the second embodiment of the present invention includes a light source 10, a color splitter 55 which has a rod shape and splits light emitted from the light source 10 according to wavelengths, a scrolling unit 20, a polarization converter 56 which converts the light emitted from the light source 10 to have one predetermined polarization, a color selector 32 which converts the polarization direction of at least some of the light having the one predetermined polarization, a plurality of light valves which process incident light according to an image signal to form a color image, and a projection lens unit 45 which enlarges and projects the color image onto a screen 50.

The projection system according to the second embodiment also includes an image combiner 35 which separately transfers light split by the color splitter 55 and the color selector 32 to the plurality of light valves, mixes images formed by the plurality of light valves, and directs the mixed image to the projection lens unit 45.

The light source 10 radiates white light and includes a lamp 11 which generates light and a reflecting mirror 13 which reflects the light emitted from the lamp 11 to guide the light to a predetermined path. The reflecting mirror 13 may be implemented by an elliptical reflector which has a location of the lamp 11 as one focus and a point at which light is collected as the other focus. Alternatively, the reflecting mirror 13 may be implemented by a parabolic reflector which has the location of the lamp 11 as a focus and reflects light emitted from the lamp 11 to be collimated.

At least one filter 5 having a slit to adjust a divergence angle of incident light and a collimating lens 14 collimating incident light are disposed on an optical path between the light source 10 and the color splitter 55.

Figure 18A:
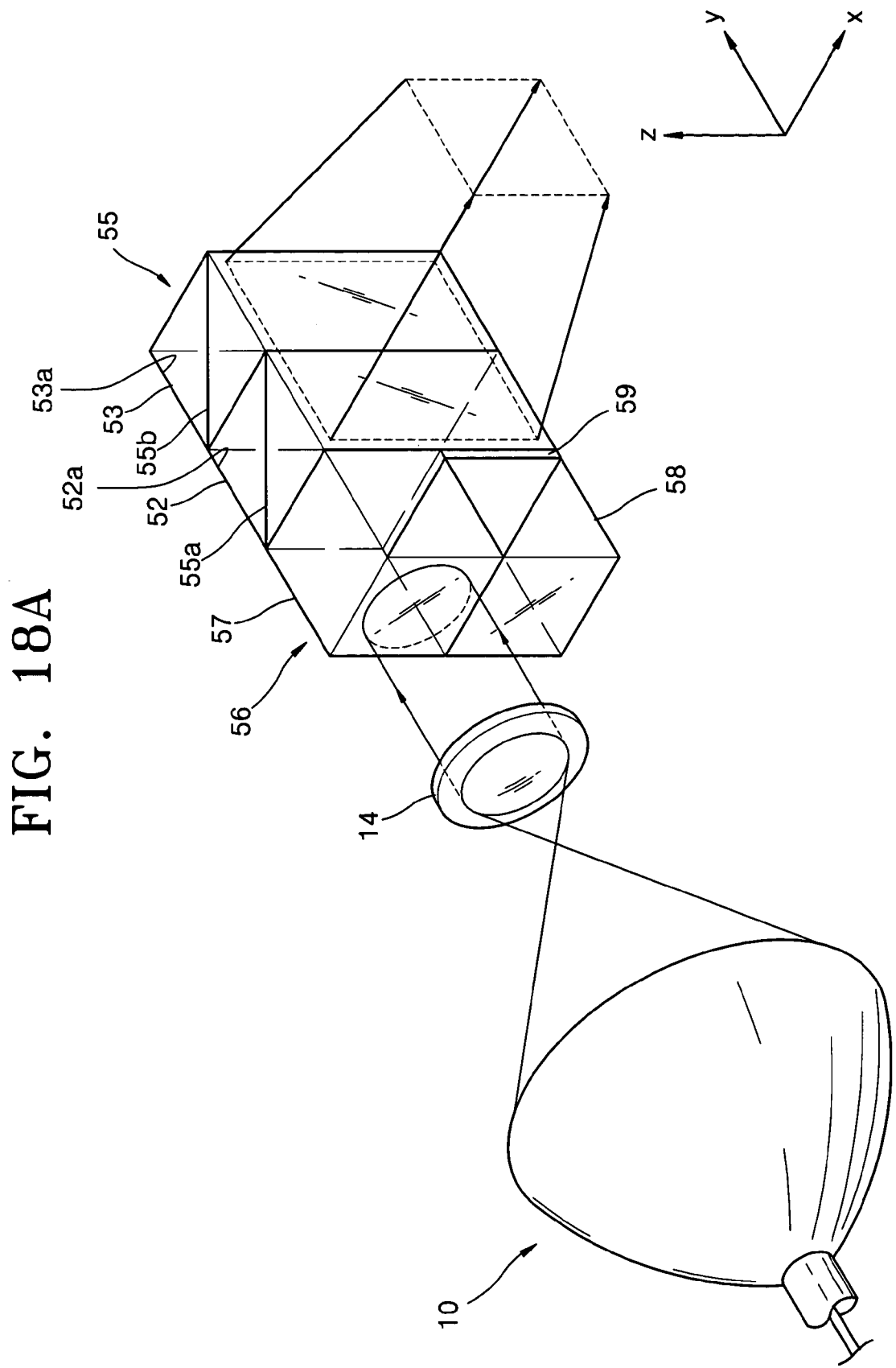
FIGS. 18A and 18B show examples, respectively, of a color splitter used by the projection system according to the second embodiment of the present invention.

The polarization converter 56 may be disposed between the light source 10 and the color splitter 55. Referring to FIG. 18A, the polarization converter 56 may include first and second polarizing beam splitter 57 and 58 and a ½ wavelength plate 59.

The first polarizing beam splitter 57 is disposed on an incident surface of a first prism 52 included in the color splitter 55. The first polarizing beam splitter 57 transmits light having one polarization in non-polarized white light incident thereonto to the first prism 52 and reflects light having another polarization toward the second polarizing beam splitter 58.

For example, the first polarizing beam splitter 57 transmits S-polarized light and reflects P-polarized light in the white light in which the P-polarized light is mixed with the S-polarized light. The second polarizing beam splitter 58 reflects the P-polarized light reflected from the first polarizing beam splitter 57. The second polarizing beam splitter 58 simply changes the path of the P-polarized light without changing polarization and thus collimates the P-polarized light with the S-polarized light output from the first polarizing beam splitter 57. The second polarizing beam splitter 58 may be implemented by a total reflection mirror which reflects all of the incident light.

The ½ wavelength plate 59 changes a phase of incident light having a predetermined polarization by 180 degrees so that the incident light having the predetermined linear polarization is changed into light having another linear polarization. The ½ wavelength plate 59 is disposed between the second polarizing beam splitter 58 and the first prism 52 and converts polarization such that the polarization of the light transmitted by the first polarizing beam splitter 57 becomes the same as that of the light reflected from the second polarizing beam splitter 58. In other words, the ½ wavelength plate 59 converts the P-polarized light reflected from the second polarizing beam splitter 58 into S-polarized light having the same polarization direction as the light transmitted by the first polarizing beam splitter 57. The ½ wavelength plate 59 may be disposed between the first polarizing beam splitter 57 and the first prism 52.

Consequently, the white light emitted from the light source 10 is converted to have the one polarization by the polarization converter 56 and then incident onto the color splitter 55.

The color splitter 55 may include a plurality of prisms having a dichroic filter slanting at a predetermined angle with respect to the axis of incident light. For example, the color splitter 55 may include the first prism 52 with a first dichroic filter 55a and a second prism 53 with a second dichroic filter 55b in a rod structure.

The color splitter 55 reflects light in a particular wavelength range and transmits light in other wavelength range, thereby splitting incident light into light in a first wavelength range and light in a second wavelength range.

The first prism 52 includes a first dichroic filter 55a slanting with respect to the axis of incident light. The first dichroic filter 55a reflects the light in the first wavelength range and transmits the light in the second wavelength range. Here, the light in the first wavelength range and the light in the second wavelength range may be the same as those described with reference to FIG. 5A. For example, the first dichroic filter 55a reflects the light E in the first wavelength range including B light and G light and transmits the light F in the second wavelength range including Y light and R light to the second dichroic filter 55b. The light F in the second wavelength range is reflected by the second dichroic filter 55b.

In addition, the first prism 52 includes a first reflecting plane 52a which forms the outer shape of the first prism 52. The first reflecting plane 52a totally reflects light, which is incident at a predetermined angle due to a difference between refractivity of the first prism 52 and refractivity of an outer atmosphere, toward the inside of the prism 52. More specifically, the first reflecting plane 52a totally reflect light which is incident thereon at an angle greater than a predetermined angle, i.e., a threshold angle, due to a difference between refractivity of the first prism 52 and refractivity of the outer atmosphere. As a result, efficiency in using incident light is increased.

The second prism 53 is disposed adjacent to the first prism 52. The second dichroic filter 55b may be replaced by a total reflection mirror to totally reflect incident light. The second prism 53 also includes a second reflecting plane 53a on its sidewall. The second reflecting plane 53a has the same function as the first reflecting plane 52a described above, and thus, a detailed description thereof will be omitted.

In the meantime, the polarization converter 56 may be disposed between the color splitter 44 and the color selector 32, not before the color splitter 55.

The scrolling unit 20 scrolls incident light by converting a rotary motion into a rectilinear motion of a lens array in a portion of the scrolling unit 20 through which the incident light passes through. The scrolling unit 20 included in the projection system according to the second embodiment of the present invention has the same characteristics as that described with reference with FIGS. 4A, 4B, and 14.

The projection system shown in FIG. 17 uses the scrolling unit 20 including the first and second spiral lens disks 23 and 24 and the light guide plate 28.

A first cylinder lens 16 is disposed between the color splitter 55 and the scrolling unit 20 to reduce the width of light incident onto the scrolling unit 20. A second cylinder lens 17 is disposed next to the scrolling unit 20 to collimate the light having the reduced width, thereby restoring the light having the reduced width to the original state. When the width of light incident onto the scrolling unit 20 is reduced using the first cylinder lens 16 such that the cross-section of a lens cell of the scrolling unit 20 similarly corresponds to that of light incident onto the scrolling unit 20, light loss can be decreased.

In addition, first and second fly-eye lens arrays 25 and 27, a color selector 32, and a relay lens 34 are disposed on an optical path between the scrolling unit 20 and the image combiner 35. The operating relationships among these members are the same as those in the first embodiment of the present invention, and thus detailed descriptions thereof will be omitted. In the meantime, the second cylinder lens 17 may be disposed between the first and second fly-eye lens arrays 25 and 27, or between the scrolling unit 20 and the first fly-eye lens array 25.

Although the color splitter 55 is structured including the first prism with the first dichroic filter 55a and the second prism 53 with the second dichroic filter 55b in FIGS. 17 and 18A, it may be structured including first through third prisms 52, 53, and 54 with first through third dichroic filters 55a, 55b, and 55c, respectively.

Light emitted from the light source 10 is converted to light having one polarization by the polarization converter 56, then primarily split according to wavelength ranges by the color splitter 55, and then secondarily split according to polarization by the color selector 32. Consequently, the light emitted from the light source 10 is split into first and second color light groups.

At least one light valve includes first and second light valves 38 and 40. The first color light group is incident onto the first light valve 38, and the second color light group is incident onto the second light valve 40. The first and second color light groups form first and second color bar groups, respectively, due to the first and second fly-eye lens arrays 25 and 27 and the relay lens 34. The first and second color light groups are the same as those described with reference to FIGS. 5A through 5C, 9A through 9C, or 12A through 12C.

The first and second color bar groups are scrolled as the scrolling unit 20 rotates, processed according to an image signal by the first and second light valves 38 and 40, and then mixed by the image combiner 35, so that a color image is formed.

The following description concerns a projection system according to a third embodiment of the present invention.

Figure 19:
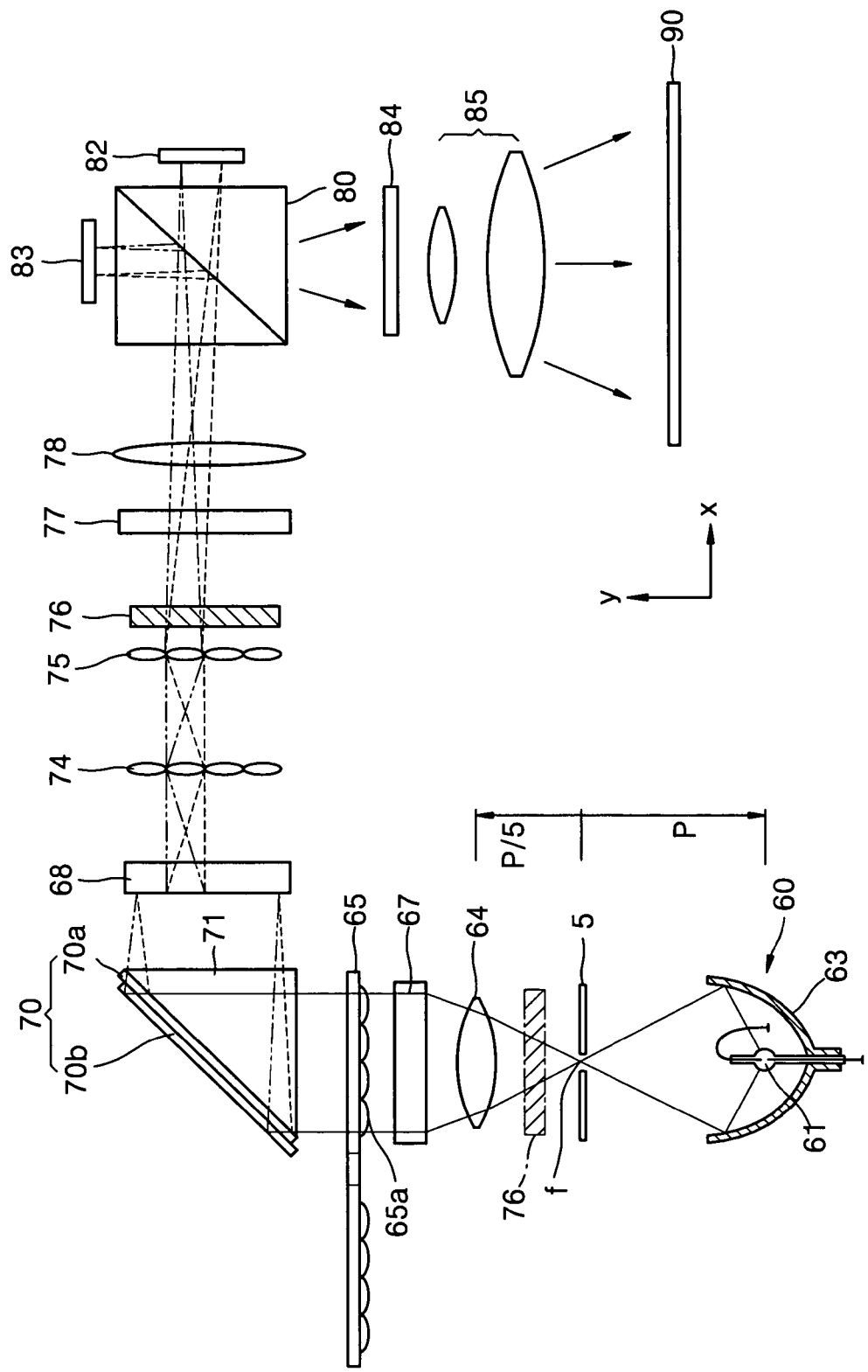
FIG. 19 is a diagram of a projection system according to a third embodiment of the present invention.

Referring to FIG. 19, the projection system according to the third embodiment includes a light source 60, a scrolling unit 65 which scrolls light emitted from the light source 60, a color splitter 70 which splits light transmitted by the scrolling unit 65 according to wavelengths, a polarization converter 76 which converts light emitted from the light source 60 to have one polarization, and a color selector 77 which converts at least partial light in the light having the one polarization to have another polarization.

In addition, the projection system according to the third embodiment includes at least two light valves and an image combiner 80. The least two light valves form an image by processing incident light according to an image signal. The image combiner 80 transfers two color light groups split by the operations of the color splitter 70, the polarization converter 76, and the color selector 77 to the at least two light valves, mixes images formed by the respective light valves, and transfers the image to a screen 90 via a projection lens unit 85.

The light source 60 radiates white light and includes a lamp 61 which generates light and a reflecting mirror 63 which reflects the light emitted from the lamp 61 to guide the light to a predetermined path. The reflecting mirror 63 may be implemented by an elliptical reflector which has a location of the lamp 61 as one focus and a point at which light is collected as the other focus. Alternatively, the reflecting mirror 63 may be implemented by a parabolic reflector which has the location of the lamp 61 as a focus and reflects light emitted from the lamp 61 to be parallel. In FIG. 19, the elliptical reflector is used as the reflecting mirror 63.

The scrolling unit 65 includes one or more lens cells 65a arranged in a spiral pattern such that a rotary motion of the scrolling unit 65 is converted into a rectilinear motion of a lens array in an area of the scrolling unit 65 through which light passes. Preferably, but not necessarily, the lens cells 65a are cylindrical lens cells. Either a disk type, as shown in FIGS. 4A and 4B, or a cylinder type, as shown in FIG. 14, may be used as the scrolling unit 65.

At least one filter 5 having a slit to adjust a divergence angle of incident light, a collimating lens 64 which collimates incident light, and a first cylinder lens 67 which reduces the width of light incident onto the scrolling unit 65 are disposed on an optical path between the light source 60 and the scrolling unit 65.

Preferably, but not necessarily, the filter 5 is positioned at a focus "f" of the light source 60. When the focal length of the light source 60 is represented by P, it is preferable, but not necessary, that the collimating lens 64 is disposed at a position separated from the focus "f" by, for example, P/5 so that an optical system can be miniaturized.

A second cylinder lens 68, first and second fly-eye lens arrays 74 and 75, and a relay lens 78 are disposed between an optical path between the color splitter 70 and the image combiner 80. The second cylinder lens 68 collimates light whose width has been reduced by the first cylinder lens 67 to restore the original width of the light. The first and second fly-eye lens arrays 74 and 75 and the relay lens 78 transfer light transmitted by the scrolling unit 65 to different positions according to wavelengths, thereby forming color bars. Although the polarization converter 76 is disposed behind the second fly-eye lens array 75 in FIG. 19, it may be disposed between the first and second fly-eye lens arrays 74 and 75 or between the light source 60 and the scrolling unit 65.

The color splitter 70 splits light emitted from the light source 60 according to wavelengths. For example, the color splitter 70 may include first and second dichroic filters 70a and 70b, which transmit or reflect incident light according to wavelengths. The first and second dichroic filters 70a and 70b may be arranged in parallel. A prism 71 may be further disposed on an optical path between the scrolling unit 65 and the color splitter 70.

At least one light valve may include first and second light valves 82 and 83.

Light emitted from the light source 60 is incident onto the scrolling unit 65 via the collimating lens 64 and the first cylinder lens 67. After passing through the scrolling unit 65, the light is split into light in a first wavelength range and light in a second wavelength range by the first and second dichroic filters 70a and 70b. The light in the first wavelength range and the light in the second wavelength range are converted to have one polarization by the polarization converter 76. Next, only light in a predetermined wavelength range is converted to have another polarization different from the one polarization by the color selector 77. As a result, the light is split into a first color light group having the one polarization and a second color light group having the another polarization.

The first and second color light groups are transmitted and reflected, respectively, by the image combiner 80 and then incident onto the first and second light valves 82 and 83, respectively. The image combiner 80 may be implemented by a polarizing beam splitter or a wire-grid polarizing beam splitter. The first and second color light groups may be those described with reference to FIGS. 5A through 5C.

Due to the operation of the first and second fly-eye lens arrays 74 and 75 and the relay lens 78, colors in the first color light group are focused on different areas on the first light valve 82 according to color, and colors in the second color light groups are focused on different areas on the second light valve 83 according to color, so that first and second color bar groups are formed on the first and second light valves 82 and 83, respectively.

As the scrolling unit 65 rotates, the first and second color bar groups are simultaneously scrolled, thereby forming first and second images on the first and second light valves 82 and 83, respectively. The first and second images are mixed by the image combiner 80 and then enlarged and projected onto the screen 90 by the projection lens unit 85.

Figure 20:
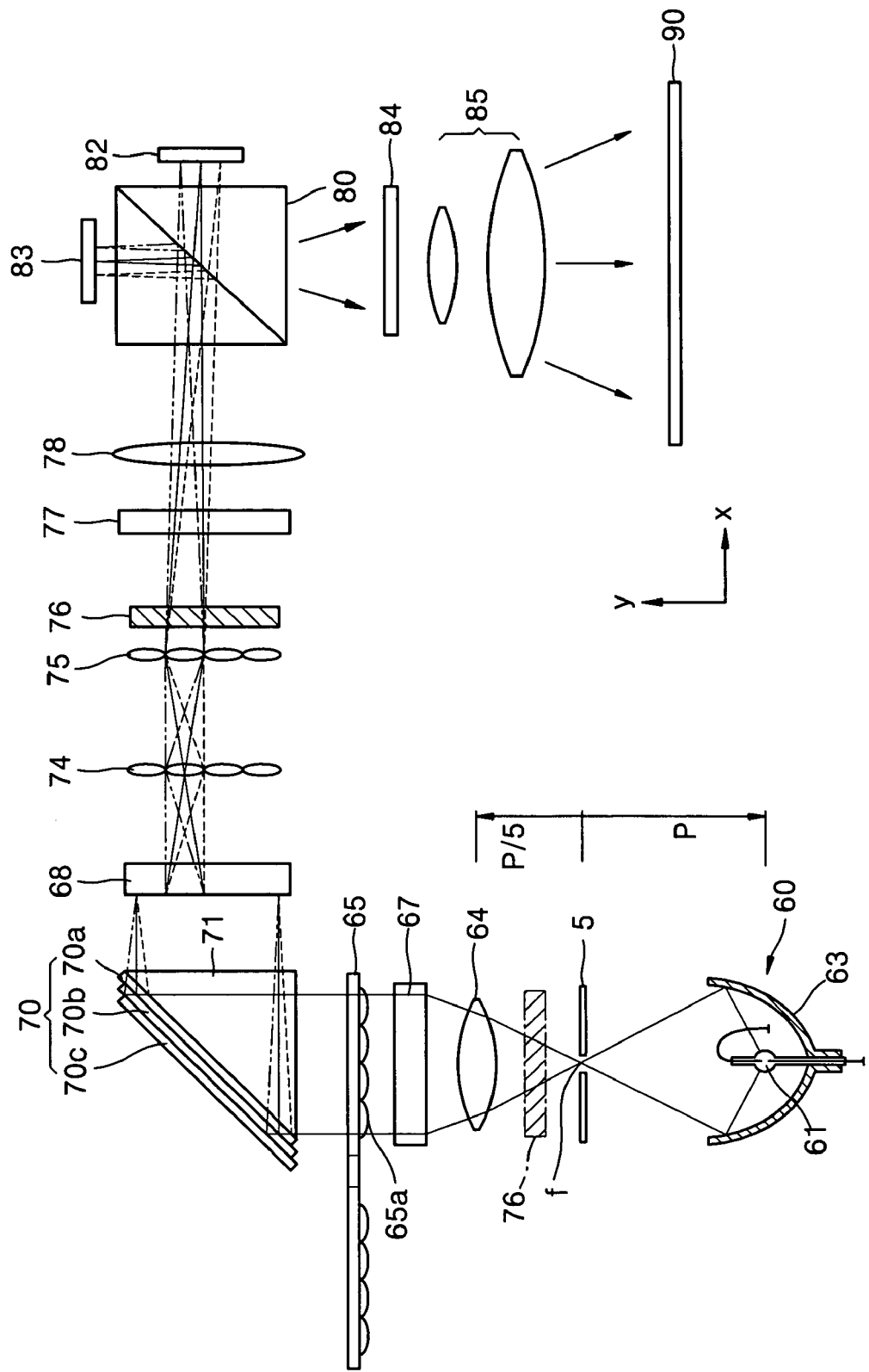
FIG. 20 is a diagram showing a modification of the projection system according to the third embodiment of the present invention.

The color splitter 70 shown in FIG. 19 is structured to include the first and second dichroic filters 70a and 70b. However, as shown in FIG. 20, it may be structured to include first through third dichroic filters 70a, 70b, and 70c (not shown).

Figure 21A:
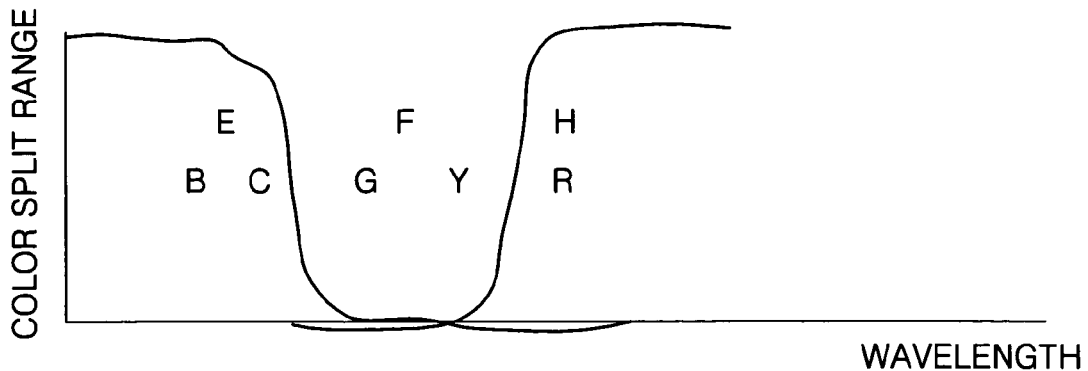
FIGS. 21A through 21C illustrate an example in which the projection system according to the third embodiment of the present invention forms a first color light group and a second color light group.

Referring to FIG. 21a, light emitted from the light source 60 is split into light E in a first wavelength range, light F in a second wavelength range, and light H in a third wavelength range by the first through third dichroic filters 70a, 70b, and 70c. For example, the light E in a first wavelength range may include B light and C light, the light F in a second wavelength range may include G light and Y light, and the light H in a third wavelength range may include R light.

Figure 21B:
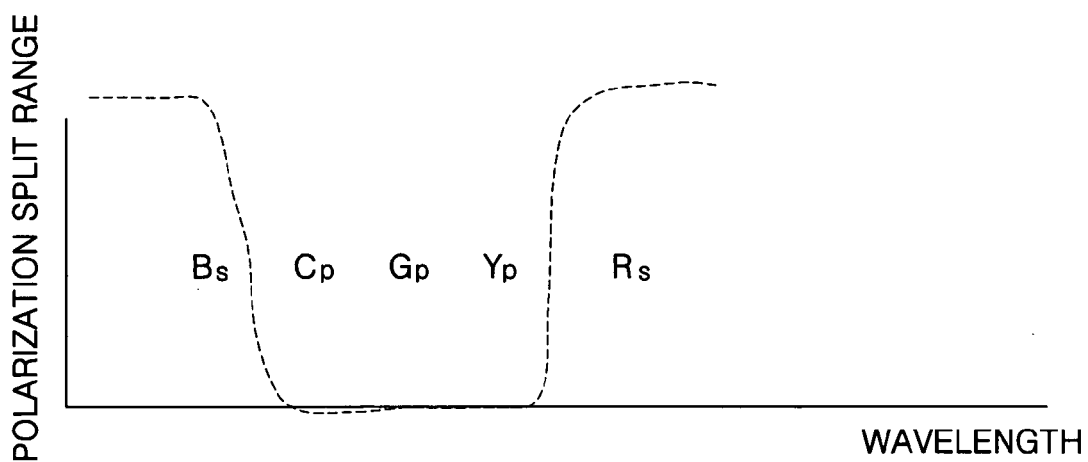

Referring to FIG. 21B, the light in the first through third wavelength ranges is converted to light having a first polarization, e.g., an S-polarization, by the polarization converter 76. The polarization of partial color light in the S-polarized light is converted into a second polarization, e.g., a P-polarization, by the color selector 77. For example, the C, G, and Y light is converted to P-polarized light. Consequently, referring to FIG. 21C, a first color light group having the S-polarization includes S-polarized B light BS and S-polarized R light RS, and a second color light group having the P-polarization includes P-polarized C, G, and Y light $C_P$, $G_P$, and $Y_P$.

The first color light group is transmitted by the image combiner 80 and then incident onto the first light valve 82, and the second color light group is reflected by the image combiner 80 and then incident onto the second light valve 83.

Figure 22:
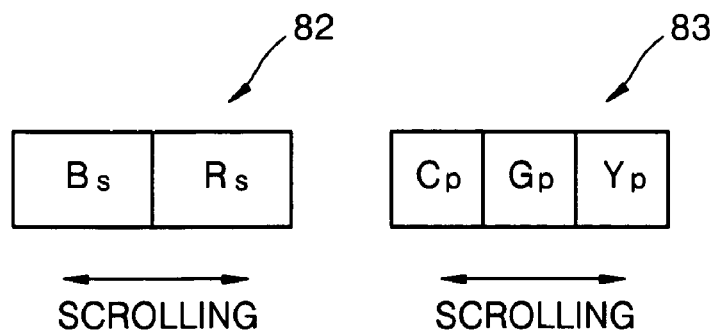
FIG. 22 illustrates a first color bar group and a second color bar group which are formed in the example shown in FIGS. 21A through 21C.

As shown in FIG. 22, the first and second color light groups form first and second color bar groups, respectively, due to the operation of the first and second fly-eye lens arrays 74 and 75 and the relay lens 78. The first and second color bar groups are simultaneously scrolled by the rotation of the scrolling unit 65 and mixed by the image combiner 80, thereby forming a color image.

In the meantime, an analyzer 84 may be further provided on an optical path between the image combiner 80 and the projection lens unit 85. The analyzer 84 performs the same function as the analyzer 43, and thus, a detailed description thereof will be omitted. In addition, a ¼ wavelength plate (not shown) may be further provided in front of the first and second light valves 82 and 83 according to types of the first and second light valves 82 and 83.

Figure 21C:
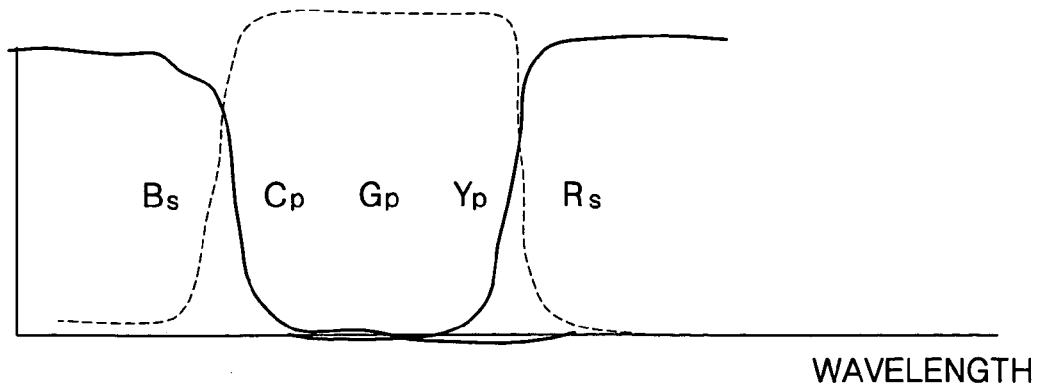

The light emitted from the light source 60 may be split into the first and second color light groups by the color splitter 70, the polarization converter 76, and the color selector 77 in various ways other than the way described with reference to FIGS. 21A through 21C. For example, the color split methods described with reference to FIGS. 9A through 9C and 12A through 12C may be used. In addition, in the first and second embodiments, the color split method described with reference to FIGS. 21A through 21C may be used.

Meanwhile, in the projection systems according to the first through third embodiments of the present invention, at least one filter 5 with a slit for adjusting a divergence angle of light is disposed between each of the light sources 10 and 60 and each of the color splitters 15, 55, and 70. The following description concerns the structure and the operation of the filter 5.

Figure 23:
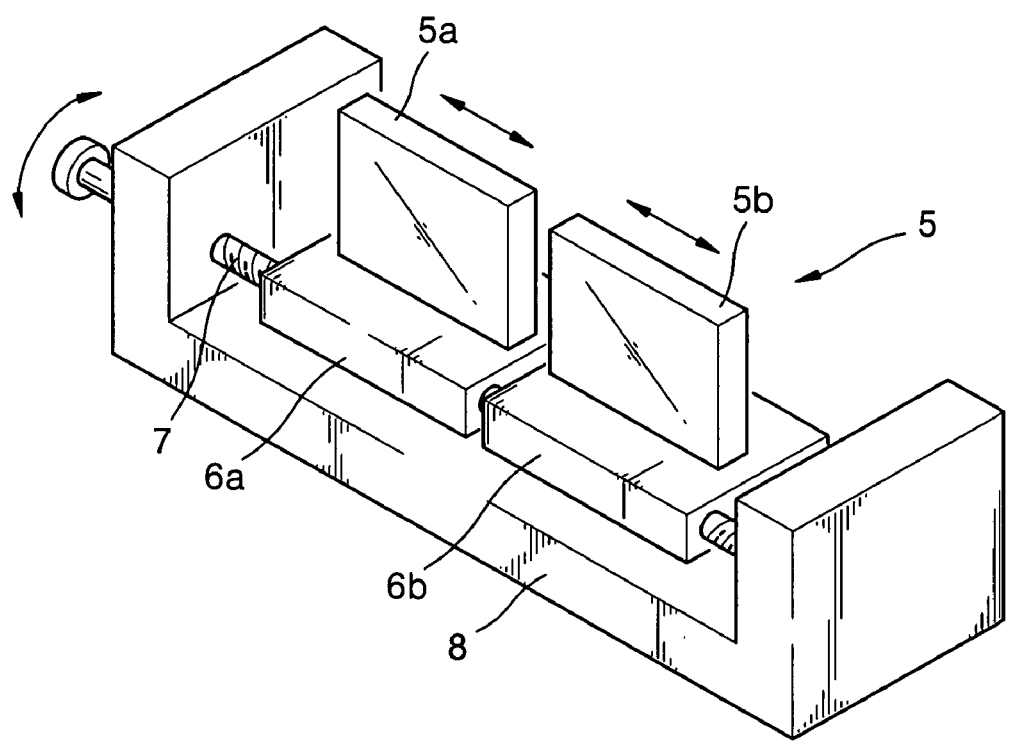
FIG. 23 is a perspective view of a spatial filter used in a projection system according to the present invention.

The filter 5 may be implemented by a spatial filter. The spatial filter 5 is structured such that a width "w" of a slit 5c can be adjusted. For example, as shown in FIG. 23, the spatial filter 5 includes a first filter plate 5a, a second filter plate 5b separated from the first filter plate 5a, first and second bases 6a and 6b which support the first and second filter plates 5a and 5b, respectively, and can be moved by a feed screw 7, and a frame 8 which supports the feed screw 7 to be rotated. When the feed screw 7 is rotated, the first and second bases 6a and 6b are moved along the feed screw 7 so that the width "w" of the slit 5c between the first and second filter plates 5a and 5b is adjusted. It is preferable, but not necessary, that the width "w" of the slit 5c is adjusted in a color split direction or a color scroll direction.

Figure 24A:
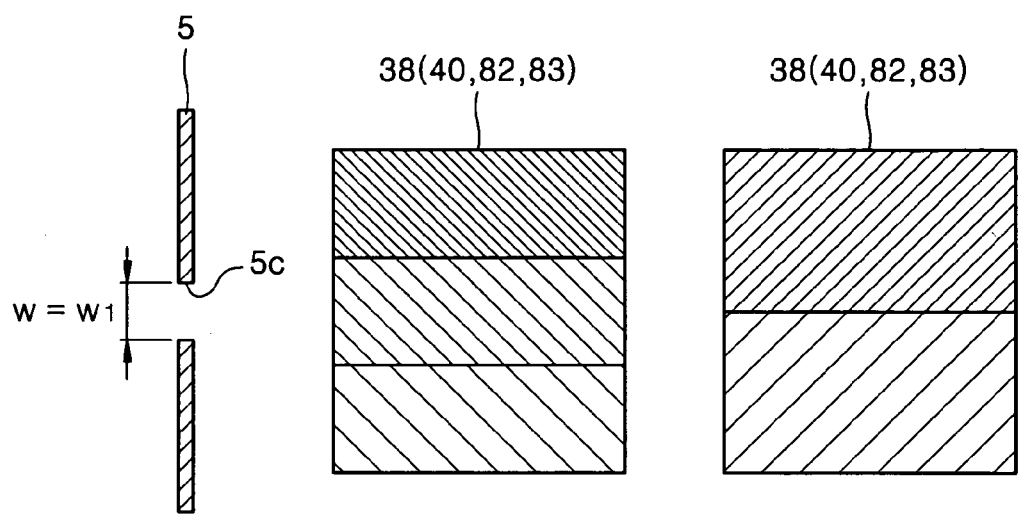
FIGS. 24A through 24C illustrate an example in which the width of a color bar formed on a light valve is adjusted by controlling the slit width of a spatial filter used in a projection system according to the present invention.
Figure 24B:
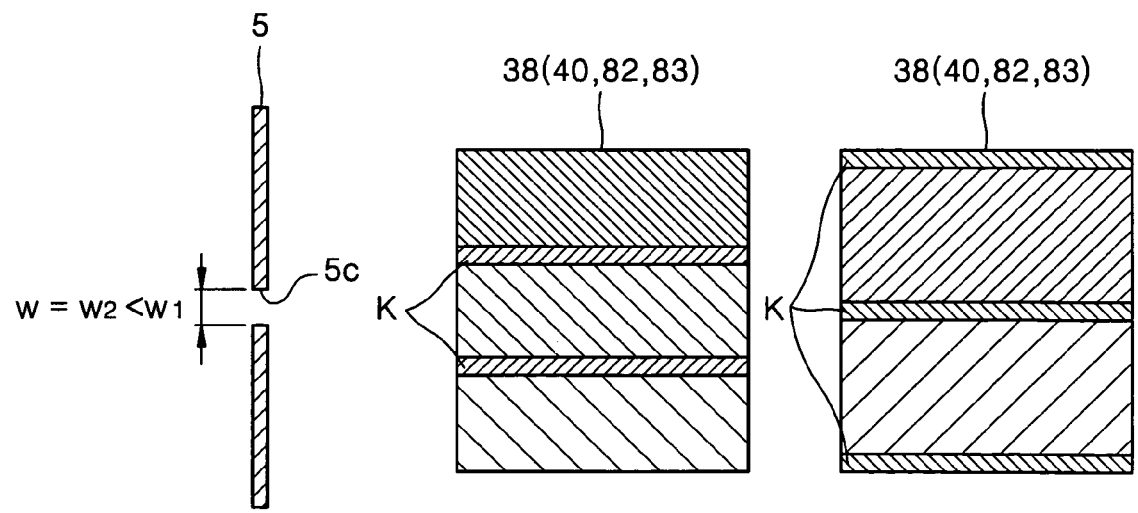
Figure 24C:
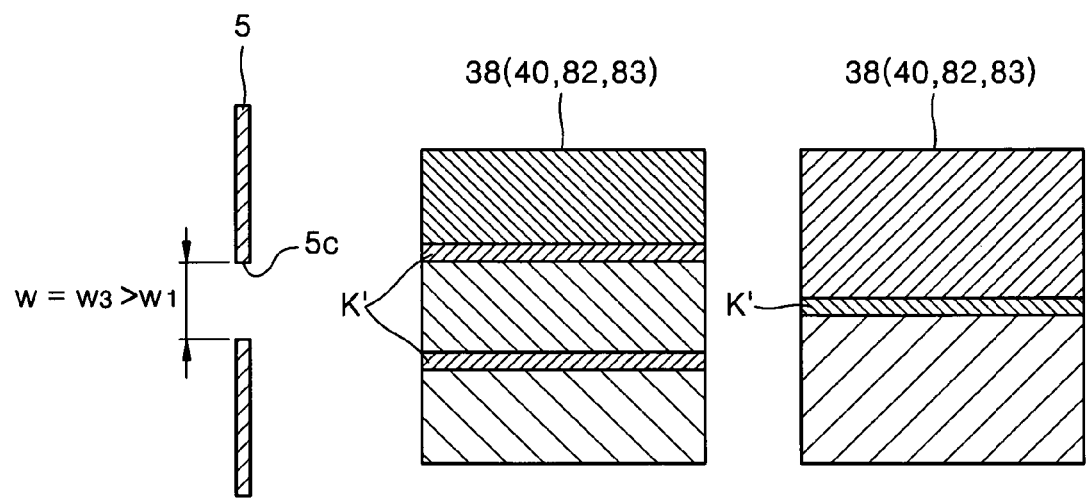

For example, as shown in FIG. 24A, let's assume that the width "w" of the slit 5c is w1, and the first and second color bar groups are divided into three or two sections on the respective first and second light valves 38, 82, 40 and 83. When the width "w" changes into w2 less than w1 (w1>w2), as shown in FIG. 24B, a black bar "k" appears between color bars in each of the first and second color bar groups. When the width "w" changes into w3 greater than w1 (w3>w1), as shown in FIG. 24C, the areas of the color bars of the first and second color bar groups increase, and therefore, an overlapping portion "k'" between the color bars appears in each of the first and second color bar groups.

Figure 25A:
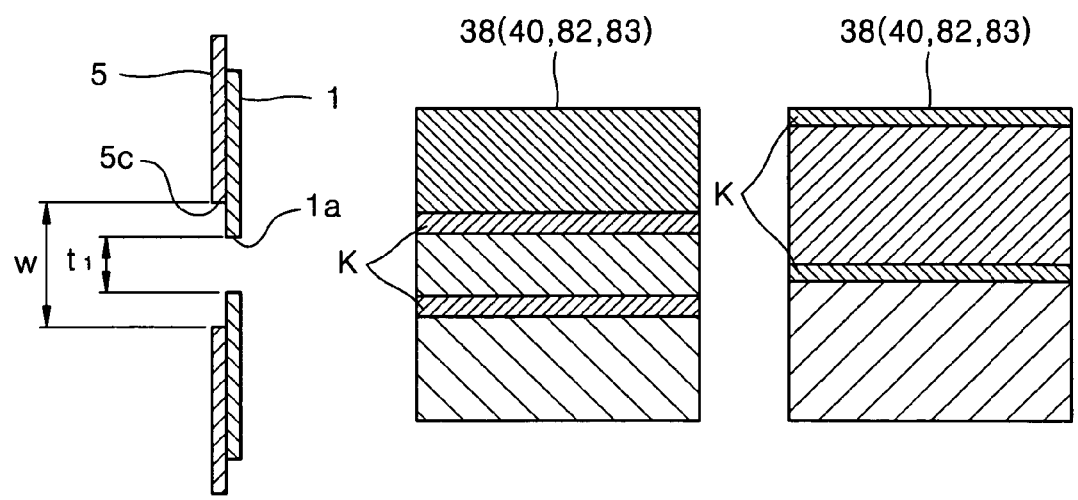
FIGS. 25A through 25C illustrate an example in which the width of a color bar formed on a light valve is adjusted by controlling slit widths of a spatial filter and a slim filter which are used in a projection system according to the present invention.
Figure 25B:
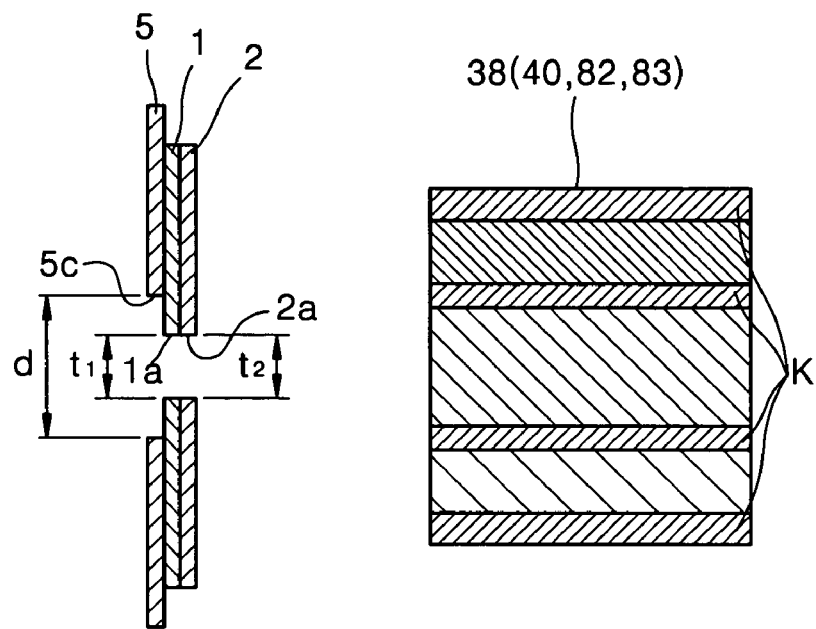
Figure 25C:
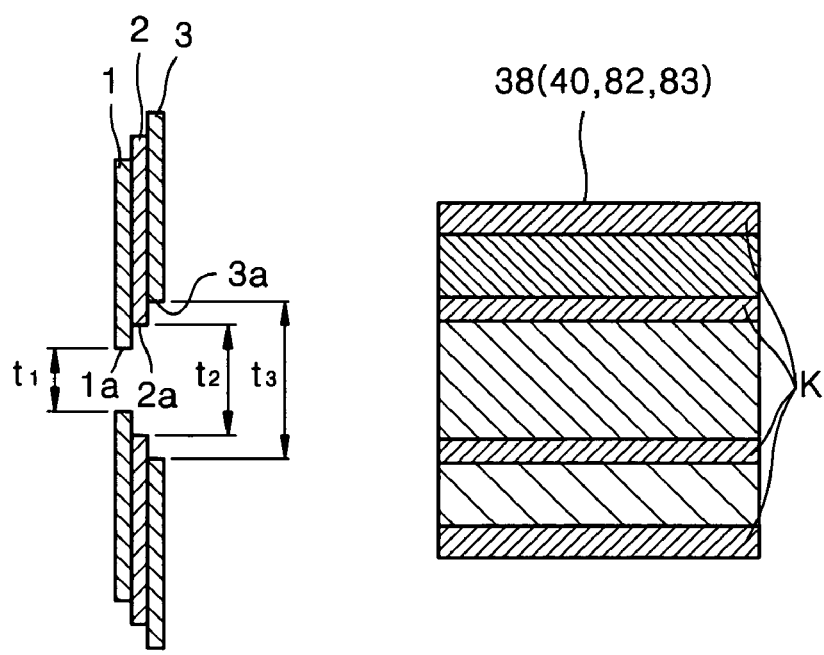

In the meantime, as shown in FIGS. 25A through 25C, a filter with a slit provided between the light source 10 and 60 and each of the color splitters 15, 55, and 70 may include the spatial filter 5 and one or more trim filters 1, 2, and 3 with first through third slits 1a, 2a, and 3a, respectively, or include the first through third trim filters 1, 2, and 3 without the spatial filter 5. The first through third slits 1a, 2a, and 3a of the respective first through third trim filters 1, 2, and 3 pass entire light as it is regardless of color of light while each of the first through third trim filters 1, 2, and 3 reflects light having a particular color and transmits light having other colors so that the divergence angle of light having the particular color can be adjusted.

FIG. 25A shows a filter having a structure in which the first trim filter 1 is attached to the spatial filter 5. The first trim filter 1 reflects light in a particular wavelength range, transmits light in other wavelength range, and passes entire light through the first slit 1a. The first trim filter 1 may be installed on the front or back of the spatial filter 5. In FIG. 25A, the first trim filter 1 is disposed on the back of the spatial filter 5. Here, the widths of the color bars in the first and second color bar groups are determined to be the same by the width "w" of the slit 5c of the spatial filter 5, and the width of a color bar in the particular wavelength range is selectively determined by a width t1 of the first slit 1a of the first trim filter 1.

When the first color bar group includes the first and fourth color bars $I_S$ and $IV_S$, and the second color bar group includes the second and third color bars $II_P$ and $III_P$, as shown in FIGS. 7A and 7B, the width of the first through fourth color bars is determined by the spatial filter 5, and, for example, the widths of the first and second color bars $I_S$ and $II_P$ or the third and fourth color bars $III_P$ and $IV_S$ can be adjusted by the first trim filter 1. Alternatively, the width of one among the first through fourth color bars $I_S$, $II_P$, $III_P$, and $IV_S$ can be adjusted.

When each of the first and second color bar groups includes three color bars, as shown in FIGS. 10A through 10C, the widths of one among the color bars of the first color bar group and one among the color bars of the second color bar group can be adjusted by the first trim filter 1. Alternatively, when the first color bar group includes three color bars and the second color bar group includes two color bars, as shown in FIG. 22, the width of at least one among the color bars of the first and second color bar groups can be adjusted by the first trim filter 1.

FIG. 25B shows a filter having a structure in which the first and second trim filters 1 and 2 are attached to the spatial filter 5. FIG. 25C shows a filter including the first through third trim filters 1, 2, and 3 without the spatial filter 5. The first through third trim filters 1, 2, and 3 may be manufactured by forming coatings corresponding to the first through third trim filters 1, 2, and 3 on the spatial filter 5 or a separate glass plate or may be manufactured in the form of separate filter plates, respectively.

The width of a particular color bar can be adjusted by adjusting widths t1 through t3 of the first through third slits 1a, 2a, and 3a of the respective first through third trim filters 1, 2, and 3. It is preferable, but not necessary, that the widths t1 through t3 and "w" of the respective first through third slits 1a, 2a, and 3a, and slit 5c are adjusted in a color split direction or a color scroll direction.

As described above, color balance can be controlled by selectively adjusting the widths of color bars, and therefore, the range of color temperature can be increased.

Moreover, the black bar "k" can be formed between color bars when necessary by adjusting the widths of the color bars. When each of the first and second light valves 38, 82, 40, and 83 is implemented by LCD or LCOS, and the color bars are continuously scrolled, an image signal changes every time when the color bars change. However, it is difficult to continuously process the changing image signal. When it is assumed that a time taken for an image signal corresponding to each color bar to be turned on is referred to as a rising time and a time taken for the image signal to be turned off is referred to as a falling time, a period corresponding to the rising and falling times are required to change image signal processing between the color bars, and thus, the black bar "k" is needed between the color bars to secure this period.

The black bar "k" can be formed by selectively adjusting the widths of color bars using the spatial filter 5 and the first through third trim filters 1, 2, and 3, and therefore, a high-quality color image can be acquired.

Figure 26:
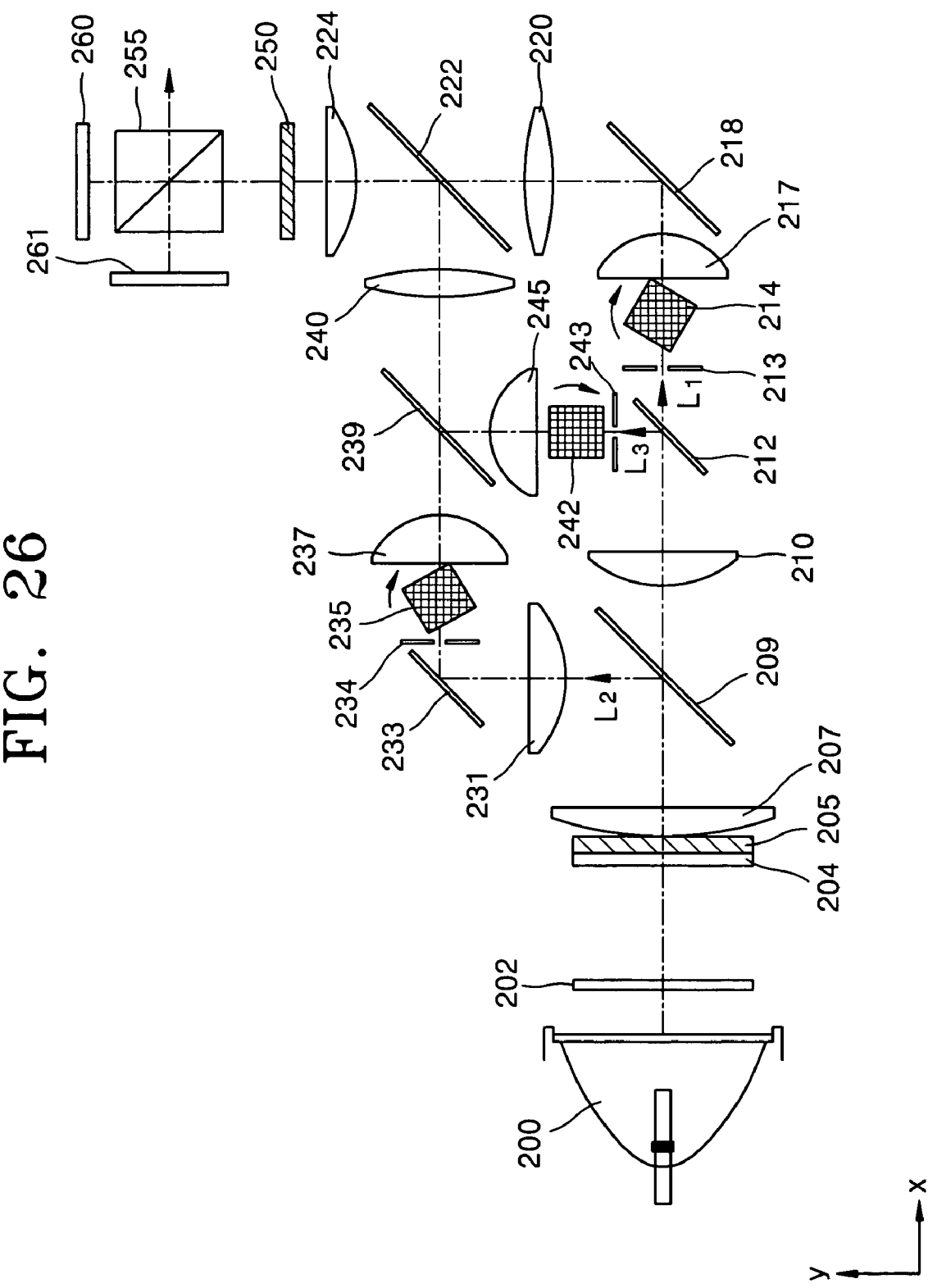
FIG. 26 is a diagram of a projection system according to a fourth embodiment of the present invention.

FIG. 26 is a diagram of a projection system according to a fourth embodiment of the present invention. The projection system according to the fourth embodiment includes a light source 200, a polarization converter 205 which converts light emitted from the light source 200 to have one polarization, a color splitter which splits the light having the one polarization into a plurality of wavelengths, a color selector 250, first and second light valves 260 and 261, an image combiner 255 which transmits or reflects the light transmitted by the color selector 250 according to a polarization direction, and a scrolling unit which scrolls color light split by the color splitter.

The color splitter includes a first dichroic filter 209 and a second dichroic filter 212. The scrolling unit includes first through third prisms 214, 235, and 242 which are rotatably disposed on paths of respective first through third color light $L_1$, $L_2$, and $L_3$ split by the first and second dichroic filters 209 and 212. As the first through third prisms 214, 235, and 242 rotate, the first through third color is $L_1$, $L_2$, and $L_3$ is scrolled. First through third filters 213, 234, and 243 with a slit for adjusting the divergence angle of incident light may be further provided in front of the respective first through third prisms 214, 235, and 242.

White light emitted from the light source 200 is converted into light having a first polarization after passing through first and second lens arrays 202 and 204 and the polarization converter 205. The light having the first polarization is split into the first through third color light $L_1$, $L_2$, and $L_3$ in first through third wavelength ranges, respectively, by the first and second dichroic filters 209 and 212.

The first through third color light $L_1$, $L_2$, and $L_3$ in first through third wavelength ranges is scrolled by the first through third prisms 214, 235, and 242, respectively. The second and third color light $L_2$, and $L_3$ in the second and through third wavelength ranges is reflected and transmitted, respectively, by a third dichroic filter 239. Finally, the first through third color light $L_1$, $L_2$, and $L_3$ in the respective first through third wavelength ranges is mixed by a fourth dichroic filter 222 and then proceed on a single path. At least partial color light in the light having the first polarization is selectively converted to have a second polarization by the color selector 250. As a result, the light having the first polarization is split into first and second color light groups. The first and second color light groups are transferred to the first and second light valves 260 and 261, respectively, by the image combiner 255. Then, the first and second light valves 260 and 261 form first and second images, respectively, and the first and second images are mixed by the image combiner 255.

A focusing lens 207 is provided behind the polarization converter 205. Lenses 210, 217, 231, 237, and 245 are provided on the paths of the first through third color light $L_1$, $L_2$, and $L_3$ to correct the paths. A focus lens 220 is disposed between the first and fourth dichroic filters 212 and 222, and a focus lens 240 is disposed between the second and fourth dichroic filters 239 and 222. A focus lens 224 is disposed between the fourth dichroic filter 222 and the image combiner 255. Path converters, for example, reflecting mirrors 218 and 233, are further provided on the paths, respectively, of the first and second color light $L_1$ and $L_2$ to change the path of light.

The first through third color light $L_1$, $L_2$, and $L_3$ in the respective first through third wavelength ranges proceed on the same path due to the fourth dichroic filter 222. The polarization direction of at least partial color light in at least one wavelength range among the first through third wavelength ranges is converted into a second polarization different from the first polarization by the color selector 250 so that the first and second color light groups are formed.

The light having the one polarization can be split into the first and second color light groups according to the color split methods and the polarization split methods described above in the first through third embodiments of the present invention. As described above, a projection system according to the present invention can be applied to any type of system which forms a color image using a scrolling operation.

The following description concerns a method of forming a color image according to an embodiment of the present invention.

Referring to FIGS. 3 and 8, light emitted from the light source 10 is split into light in a plurality of wavelength ranges, which is converted to have a single polarization. Alternatively, the light emitted from the light source 10 is first converted to have a single polarization and is then split into light in a plurality of wavelength ranges.

Figure 18B:
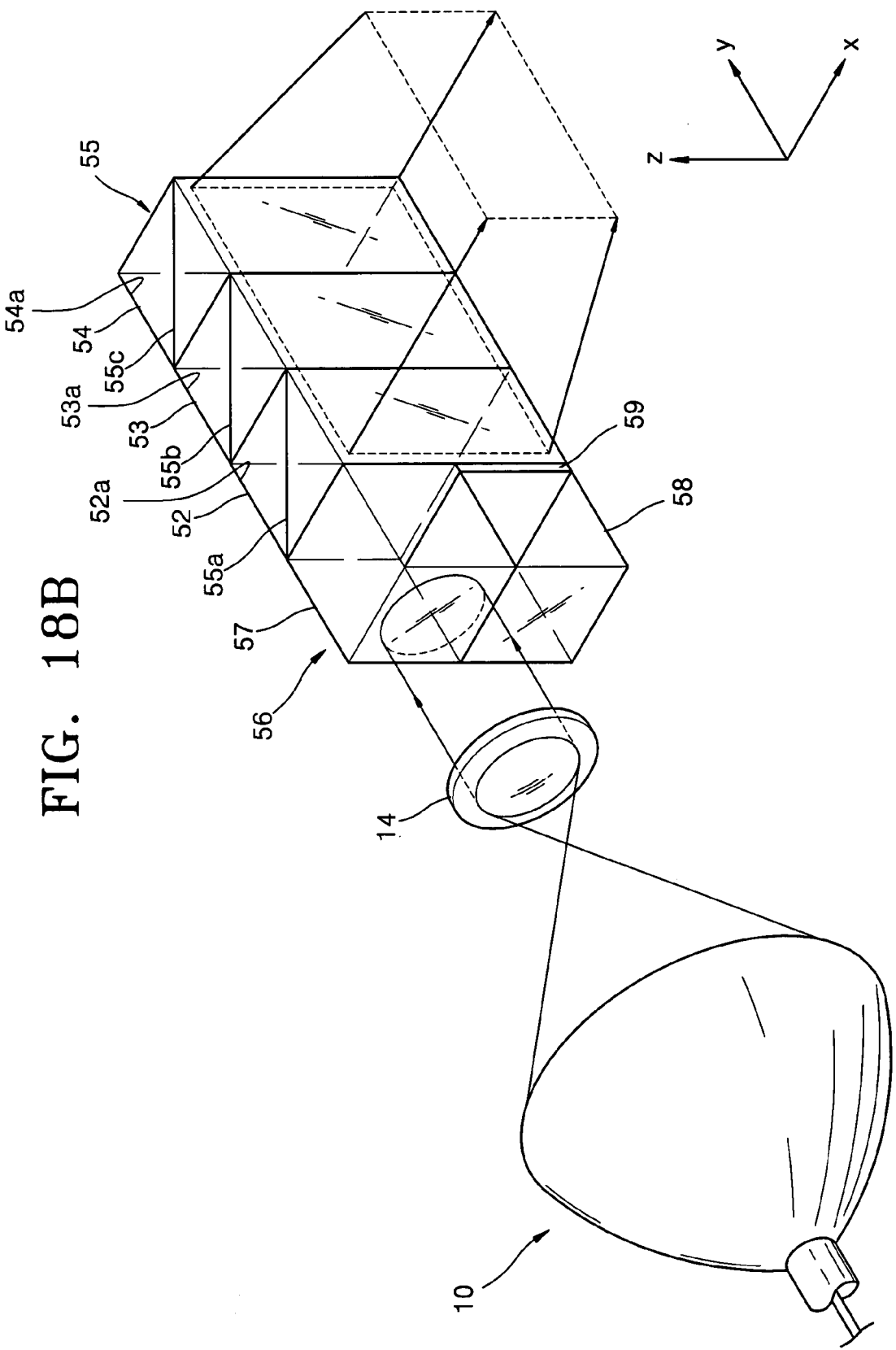

The light emitted from the light source 10 is split by the color splitter 15 including a plurality of dichroic filters. In one embodiment, the color splitter 15 may include a plurality of dichroic filters 15a through 15c slating at different angles, as shown in FIGS. 3 and 8. In another embodiment, a color splitter 55 having a rod structure may be provided to split light into a plurality of wavelength ranges, as shown in FIGS. 18A and 18b. In still another embodiment, a color splitter 70 including dichroic filters disposed in parallel, as shown in FIGS. 19 and 20 may be provided to split light.

Next, the polarization direction of at least some of the light having the first polarization is converted into another polarization so that the light is split into a first color light group and a second color light group. Here, the polarization direction of at least some of the light in at least one wavelength range of the light split into the plurality of wavelength ranges by the color splitter 15, 55, or 70 is converted. The polarization direction of light in only a desired wavelength range can be selectively converted using the color selector 32 or 77.

The first and second color light groups are focused onto a plurality of light valves, for example, the first and second light valves 38 or 82 and 40 or 83, and the first and second light valves form first and second images, respectively. When the first and second color light groups are focused on the first and second light valves, respectively, first and second color bar groups are formed and are periodically and simultaneously scrolled by the scrolling unit 20 or 65. The first and second images are mixed by the image combiner 35 or 80, forming a color image. The color image is enlarged and projected onto the screen 50 or 90 by the project lens unit 45 or 85.

In a method of forming a color image according to the present invention, white light emitted from a light source can be split into as many colors as desired, and the colors can be separately focused on a plurality of light valves, so that a multichannel color image can be easily formed.

As described above, in a projection system according to the present invention, a plurality of colors are separately incident onto a plurality of light valves, which are independently driven. Accordingly, light emitted from a light source can be easily split into many, for example, four or more, colors. When the number of colors increases, a color gamut and the range of color temperature increase. As a result, the quality of a color picture can be produced in various ways, and an image closed to natural color can be acquired. In addition, since the plurality of colors are separately focused on the plurality of light valves, an etendue can be reduced as compared to a case where a single light valve is used for the plurality of colors to form a color image. Accordingly, an optical system can be simplified and miniaturized.

Moreover, since three or more colors proceed on a single path, a multichannel color image system can be implemented without significantly increasing the system size and manufacturing cost. Furthermore, when a method of forming a color image according to the present invention is used, any type of system forming a color image using a scrolling operation can be enabled to easily form a multichannel image by further providing several optical elements.

What is claimed is:

1. A projection system comprising:
   a light source;
   a color splitter which splits light emitted from the light source into colors according to a plurality of wavelength ranges;
   a scrolling unit which scrolls the colors split and transmitted by the color splitter;
   a polarization converter which converts the light emitted from the light source into light having a first polarization;
   a color selector which converts at least some of the light, transmitted by the scrolling unit and having the first polarization to light having a second polarization different from the first polarization;

an image combiner which transmits or reflects light transmitted by the color selector according to a polarization direction; and at least two light valves each of which receives light transmitted by the image combiner and processes the received light according to an image signal to form an image.

2. The projection system of claim 1, wherein the scrolling unit is installed rotatably, and comprises at least one cylindrical lens cell arranged in a spiral pattern.

3. The projection system of claim 1, wherein the scrolling unit comprises a first spiral lens disk and a second spiral lens disk each of which includes at least one cylindrical lens cell arranged in a spiral pattern.

4. The projection system of claim 3, wherein the scrolling unit further comprises a light guide between the first and second spiral lens disks.

5. The projection system of claim 4, wherein the light guide is a light guide plate.

6. The projection system of claim 4, wherein the light guide is a glass rod.

7. The projection system of claim 1, wherein the scrolling unit comprises at least one cylindrical lens cell formed in a spiral pattern on a pillar surface.

8. The projection system of claim 7, wherein the scrolling unit further comprises a light guide therewithin.

9. The projection system of claim 8, wherein the light guide is a light guide plate.

10. The projection system of claim 8, wherein the light guide is a glass rod.

11. The projection system of claim 1, wherein the color splitter comprises at least two dichroic filters which slant at different angles with respect to an optical axis.

12. The projection system of claim 1, wherein the color splitter comprises at least two prisms each of which includes a dichroic filter.

13. The projection system of claim 1, further comprising at least one filter disposed on an optical path between the light source and the color splitter, the filter comprising a slit for adjusting a divergence angle of incident light.

14. The projection system of claim 1, wherein the image combiner is a polarizing beam splitter or a wire-grid polarizing beam splitter.

15. The projection system of claim 1, further comprising an analyzer which analyzes light output from the image combiner.

16. The projection system of claim 1, further comprising:
a first cylindrical lens disposed on an optical path between the light source and the scrolling unit, which reduces a width of light incident onto the scrolling unit; and
a second cylindrical lens disposed on an optical path between the color splitter and the image combiner, which collimates light transmitted by the scrolling unit.

17. The projection system of claim 1, further comprising a ¼ wavelength plate disposed between the image combiner and the at least two light valves.

18. The projection system of claim 1, further comprising a first fly-eye lens array and a second fly-eye lens array disposed on an optical path between the color splitter and the image combiner.

19. The projection system of claim 18, further comprising a relay lens disposed on an optical path between the second fly-eye lens array and the image combiner.

20. A projection system comprising:
a light source;
a color splitter which splits light emitted from the light source into colors in a plurality of wavelength ranges, the color splitter comprising first and second dichroic filters slating at different angles with respect to an optical axis;
a scrolling unit which scrolls the colors split and transmitted by the color splitter;
a polarization converter which converts the light emitted from the light source into light having a first polarization;
a color selector which converts at least some of the light transmitted by the scrolling unit and having the first polarization to have a second polarization different from the first polarization;
an image combiner which transmits or reflects light transmitted by the color selector according to a polarization direction; and
first and second light valves each of which receives light transmitted by the image combiner and processes the received light according to an image signal to form an image.

21. The projection system of claim 20, wherein the scrolling unit is installed rotatably and comprises at least one cylindrical lens cell arranged in a spiral pattern.

22. The projection system of claim 20, wherein the scrolling unit comprises a first spiral lens disk and a second spiral lens disk each of which includes at least one cylindrical lens cell arranged in a spiral pattern.

23. The projection system of claim 22, wherein the scrolling unit further comprises a light guide between the first and second spiral lens disks.

24. The projection system of claim 23, wherein the light guide is a light guide plate.

25. The projection system of claim 23, wherein the light guide is a glass rod.

26. The projection system of claim 20, wherein the scrolling unit comprises at least one cylindrical lens cell formed in a spiral pattern on a pillar surface.

27. The projection system of claim 26, wherein the scrolling unit further comprises a light guide therewithin.

28. The projection system of claim 27, wherein the light guide is a light guide plate.

29. The projection system of claim 27, wherein the light guide is a glass rod.

30. The projection system of claim 20, wherein the color splitter further comprises a first prism comprising the first dichroic filter and a second prism comprising the second dichroic filter.

31. The projection system of claim 20, wherein the first and second dichroic filters split the light emitted from the light source into light in a first wavelength range and light in a second wavelength range, and the color selector converts a polarization direction of at least some of the light in at least one of the first and second wavelength ranges.

32. The projection system of claim 20, wherein:
the first dichroic filter reflects light in the first wavelength range, including a first color and a second color;
the second dichroic filter reflects light in the second wavelength range, including a third color and a fourth color;
and the color selector converts the polarization direction of the first and third colors.

33. The projection system of claim 20, wherein the color splitter further comprises a third dichroic filter which slants at a different angle than the first and second dichroic filters.

34. The projection system of claim 33, wherein the first through third dichroic filters split the light emitted from the light source into light in first through third wavelength ranges, respectively, and the color selector converts a polarization direction of at least some of the light in at least one among the first through third wavelength ranges.

35. The projection system of claim 33, wherein:
the first dichroic filter reflects light in the first wavelength range, including a first color and a second color;
the second dichroic filter reflects light in the second wavelength range, including a third color and a fourth color;
the third dichroic filter reflects light in the third wavelength range, including a fifth color and a sixth color; and
the color selector converts the polarization direction of the first, third, and fifth colors.

36. The projection system of claim 30, wherein the color splitter further comprises a third prism comprising a third dichroic filter.

37. The projection system of claim 20, further comprising at least one filter disposed on an optical path between the light source and the scrolling unit, the filter comprising a slit for adjusting a divergence angle of incident light.

38. The projection system of claim 37, wherein the at least one filter comprises a spatial filter.

39. The projection system of claim 37, wherein the at least one filter comprises a spatial filter and at least one trim filter.

40. The projection system of claim 20, wherein the image combiner is a polarizing beam splitter or a wire-grid polarizing beam splitter.

41. The projection system of claim 20, further comprising:
a first cylindrical lens, disposed on an optical path between the light source and the scrolling unit, and which reduces a width of light incident onto the scrolling unit; and
a second cylindrical lens, disposed on an optical path between the color splitter and the image combiner, and which collimates light transmitted by the scrolling unit.

42. The projection system of claim 20, further comprising a ¼ wavelength plate disposed between the image combiner and each of the first and second light valves.

43. The projection system of claim 20, further comprising a first fly-eye lens array and a second fly-eye lens array disposed on an optical path between the color splitter and the image combiner.

44. The projection system of claim 43, further comprising a relay lens disposed on an optical path between the second fly-eye lens array and the image combiner.

45. A projection system comprising:
a light source;
a scrolling unit, installed rotatably, which comprises one or more lens cells and which scrolls incident light;
a color splitter which splits the light transmitted by the scrolling unit according to at least two wavelength ranges;
a polarization converter which converts the light emitted from the light source into light having a first polarization;
a color selector which converts at least some of the light transmitted by the polarization converter and having the first polarization to light having a second polarization different from the first polarization;
an image combiner which transmits or reflects light transmitted by the color selector according to a polarization direction; and
at least two light valves each of which receives light transmitted by the image combiner and processes the received light according to an image signal to form an image.

46. The projection system of claim 45, wherein the scrolling unit comprises at least one cylindrical lens cell arranged in a spiral pattern, and wherein a rotary motion of the scrolling unit is converted into a rectilinear motion of a lens array in an area of the scrolling unit through which light passes.

47. The projection system of claim 45, wherein the scrolling unit comprises a first spiral lens disk and a second spiral lens disk each of which includes at least one cylindrical lens cell arranged in a spiral pattern, the first and second spiral lens disks being separated from each other by a predetermined distance.

48. The projection system of claim 47, wherein the scrolling unit further comprises a light guide between the first and second spiral lens disks.

49. The projection system of claim 48, wherein the light guide is a light guide plate.

50. The projection system of claim 48, wherein the light guide is a glass rod.

51. The projection system of claim 45, wherein the scrolling unit comprises at least one cylindrical lens cell formed in a spiral pattern on a pillar surface.

52. The projection system of claim 51, wherein the scrolling unit further comprises a light guide therewithin.

53. The projection system of claim 52, wherein the light guide is a light guide plate.

54. The projection system of claim 52, wherein the light guide is a glass rod.

55. The projection system of claim 45, wherein the color splitter comprises at least two dichroic filters which are parallel to each other.

56. The projection system of claim 45, wherein the color splitter comprises at least two prisms each of which comprises a dichroic filter.

57. The projection system of claim 45, further comprising at least one filter disposed on an optical path between the light source and the color splitter, the filter comprising a slit for adjusting a divergence angle of incident light.

58. The projection system of claim 45, wherein the image combiner is a polarizing beam splitter or a wire-grid polarizing beam splitter.

59. The projection system of claim 45, further comprising an analyzer which analyzes light output from the image combiner.

60. The projection system of claim 45, further comprising:
a first cylindrical lens, disposed on an optical path between the light source and the scrolling unit, which reduces a width of light incident onto the scrolling unit; and
a second cylindrical lens disposed on an optical path between the color splitter and the image combiner, which collimates light transmitted by the scrolling unit.

61. The projection system of claim 45, further comprising a ¼ wavelength plate disposed between the image combiner and the at least two light valves.

62. The projection system of claim 45, further comprising a first fly-eye lens array and a second fly-eye lens array disposed on an optical path between the color splitter and the image combiner.

63. The projection system of claim 62, further comprising a relay lens disposed on an optical path between the second fly-eye lens array and the image combiner.

64. A projection system comprising:
a light source;
a scrolling unit installed rotatably, which comprises one or more lens cells and scrolls incident light;
a color splitter comprising first and second dichroic filters arranged in parallel with each other, which splits the light transmitted by the scrolling unit according to wavelength;
a polarization converter which converts the light emitted from the light source into light having a first polarization;
a color selector which converts at least some of the light transmitted by the polarization converter having the first polarization to light having a second polarization different from the first polarization;
an image combiner which transmits or reflects light transmitted by the color selector according to a polarization direction; and
first and second light valves each of which receives light transmitted by the image combiner and processes the received light according to an image signal to form an image.

65. The projection system of claim 64, wherein the scrolling unit comprises at least one cylindrical lens cell arranged in a spiral pattern, and wherein a rotary motion of the scrolling unit is converted into a rectilinear motion of a lens array in an area of the scrolling unit through which light passes.

66. The projection system of claim 64, wherein the scrolling unit comprises a first spiral lens disk and a second spiral lens disk each of which includes at least one cylindrical lens cell arranged in a spiral pattern, the first and second spiral lens disks being separated from each other by a predetermined distance.

67. The projection system of claim 66, wherein the scrolling unit further comprises a light guide between the first and second spiral lens disks.

68. The projection system of claim 67, wherein the light guide is a light guide plate.

69. The projection system of claim 67, wherein the light guide is a glass rod.

70. The projection system of claim 64, wherein the scrolling unit comprises at least one cylindrical lens cell formed in a spiral pattern on a pillar surface.

71. The projection system of claim 70, wherein the scrolling unit further comprises a light guide therewithin.

72. The projection system of claim 71, wherein the light guide is a light guide plate.

73. The projection system of claim 71, wherein the light guide is a glass rod.

74. The projection system of claim 64, wherein the color splitter further comprises a first prism comprising the first dichroic filter and a second prism comprising the second dichroic filter.

75. The projection system of claim 64, wherein the first and second dichroic filters split the light emitted from the light source into light in a first wavelength range and light in a second wavelength range, and the color selector converts a polarization direction of at least some of the light in at least one of the first and second wavelength ranges.

76. The projection system of claim 64, wherein:
the first and second dichroic filters split the light emitted from the light source into light in a first wavelength range and light in a second wavelength range;
the light in the first wavelength range comprises a first color and a second light;
the light in the second wavelength range comprises a third light and a fourth light; and
the color selector converts the polarization direction of the first and third colors.

77. The projection system of claim 64, wherein the color splitter further comprises a third dichroic filter which slants at a different angle than the first and second dichroic filters.

78. The projection system of claim 77, wherein the first through third dichroic filters split the light emitted from the light source into light in first through third wavelength ranges, respectively, and the color selector converts a polarization direction of at least some of the light in at least one among the first through third wavelength ranges.

79. The projection system of claim 77, wherein:
the first through third dichroic filters split the light emitted from the light source into light in first through third wavelength ranges, respectively;
the light in the first wavelength range comprises a first color and a second color;
the light in the second wavelength range comprises a third color and a fourth color;
the light in the third wavelength range comprises a fifth light and a sixth light; and
the color selector converts the polarization direction of the first, third, and fifth colors.

80. The projection system of claim 74, wherein the color splitter further comprises a third prism comprising a third dichroic filter.

81. The projection system of claim 64, further comprising at least one filter disposed on an optical path between the light source and the color splitter, the filter comprising a slit for adjusting a divergence angle of incident light.

82. The projection system of claim 64, wherein the image combiner is a polarizing beam splitter or a wire-grid polarizing beam splitter.

83. The projection system of claim 64, further comprising:
a first cylindrical lens, disposed on an optical path between the light source and the scrolling unit, which reduces a width of light incident onto the scrolling unit; and
a second cylindrical lens disposed on an optical path between the color splitter and the image combiner, which collimates light transmitted by the scrolling unit.

84. The projection system of claim 64, further comprising a first fly-eye lens array and a second fly-eye lens array disposed on an optical path between the color splitter and the image combiner.

85. The projection system of claim 84, further comprising a relay lens disposed on an optical path between the second fly-eye lens array and the image combiner.

86. A method of forming a color image, comprising:
splitting incident light into a plurality of wavelength ranges;
converting the incident light to have a first polarization;
converting at least some of the light having the first polarization to have a second polarization different from the first polarization;
separately modulating color light having the first polarization and color light having the second polarization using a plurality of light valves; and scrolling the color light having the first polarization and the color light having the second polarization to form a color image.

87. The method of claim 86, wherein splitting incident light is performed using a color splitter comprising a plurality of dichroic filters arranged in parallel with each other.

88. The method of claim 86, wherein splitting incident light is performed using a color splitter comprising a plurality of dichroic filters slanting at different angles.

89. The method of claim 86, wherein scrolling the color light is performed by converting a rotary motion of a scrolling unit, which comprises at least one cylindrical lens cell arranged in a spiral pattern, into a rectilinear motion of a lens array in an area of the scrolling unit through which light passes.

* * * * *